(12) United States Patent
Nishio et al.

(10) Patent No.: US 11,169,431 B2
(45) Date of Patent: Nov. 9, 2021

(54) CAMERA AND CAMERA ACCESSORY

(71) Applicant: CANON KABUSHIKI KAISHA, Tokyo (JP)

(72) Inventors: Tetsuya Nishio, Kawasaki (JP); Yoshihiko Konno, Tachikawa (JP); Tatsuyuki Tokunaga, Saitama (JP); Takashi Hasegawa, Tokyo (JP); Hiroshi Kikuchi, Zushi (JP); Azusa Sugawara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/730,676

(22) Filed: Dec. 30, 2019

(65) Prior Publication Data
US 2020/0142286 A1  May 7, 2020

Related U.S. Application Data

(62) Division of application No. 15/345,661, filed on Nov. 8, 2016, now Pat. No. 10,527,912, which is a division
(Continued)

(30) Foreign Application Priority Data

Apr. 4, 2012  (JP) .................................. 2012-085190
Apr. 4, 2012  (JP) .................................. 2012-085223
(Continued)

(51) Int. Cl.
*G03B 17/56* (2021.01)
*G03B 17/14* (2021.01)

(52) U.S. Cl.
CPC ........... *G03B 17/565* (2013.01); *G03B 17/14* (2013.01); *G03B 17/566* (2013.01); *G03B 2206/00* (2013.01)

(58) Field of Classification Search
CPC ...... G03B 17/56; G03B 17/00; G03B 17/565; G03B 17/566; G03B 17/12; G03B 17/14; G03B 2206/00; G02B 7/14; G02B 7/022
(Continued)

(56) References Cited

U.S. PATENT DOCUMENTS 4,448,509 A  5/1984  Katsuma et al.
4,464,034 A  8/1984  Tomino
(Continued)

FOREIGN PATENT DOCUMENTS

CN  1761910 A  4/2006
CN  1806204 A  7/2006
(Continued)

OTHER PUBLICATIONS

European Notice of Allowance dated Jan. 16, 2020, that issued in the corresponding European Patent Application No. 13162291.2.
(Continued)

*Primary Examiner* — Clayton E. LaBalle
*Assistant Examiner* — Fang-Chi Chang
(74) *Attorney, Agent, or Firm* — Cowan, Liebowitz & Latman, P.C.

(57)  ABSTRACT

The camera side mount is brought, by relative rotation with the accessory side mount, from a first state where each accessory side bayonet claw is inserted between the camera side bayonet claws into a second state where the camera side and accessory side bayonet claws engage with each other. The leaf spring biasing the camera side contact pins in the protruding direction is disposed between the camera side mount and the camera body. When the camera being in the normal position is viewed from the direction facing the camera side mount, the leaf spring extends from both sides of the mount center line, which extends from the center of the camera side mount in the direction of gravity, toward the
(Continued)

camera side contact pins. The camera side contact pins are arranged at positions other than a position on the mount center line.

15 Claims, 22 Drawing Sheets

Related U.S. Application Data of application No. 13/856,652, filed on Apr. 4, 2013, now Pat. No. 9,638,987.

(30) Foreign Application Priority Data

| Apr. 4, 2012 | (JP) | 2012-085426 |
|---|---|---|
| Jul. 5, 2012 | (JP) | 2012-150961 |
| Jul. 20, 2012 | (JP) | 2012-161142 |

(58) Field of Classification Search
USPC ............................................................ 396/532
See application file for complete search history.

(56) References Cited

U.S. PATENT DOCUMENTS

| 4,737,812 | A | 4/1988 | Hasegawa et al. |
|---|---|---|---|
| 4,739,356 | A | 4/1988 | Ogura et al. |
| 4,841,322 | A | 6/1989 | Kawasaki et al. |
| 4,853,725 | A | 8/1989 | Matsuda et al. |
| 4,860,043 | A | 8/1989 | Kurei et al. |
| 4,999,659 | A | 3/1991 | Fukahori et al. |
| 5,030,982 | A | 7/1991 | Takebayashi |
| 5,079,578 | A | 1/1992 | Kohno et al. |
| 5,177,520 | A | 1/1993 | Kohno et al. |
| 5,371,566 | A * | 12/1994 | Asakura ............ G02B 7/102 396/71 |
| 5,613,171 | A * | 3/1997 | Aihara ............... G03B 17/14 396/531 |
| 5,781,818 | A | 7/1998 | Kobayashi |
| 6,041,189 | A | 3/2000 | Izukawa |
| 6,341,902 | B1 | 1/2002 | Sato et al. |
| 6,352,378 | B1 | 3/2002 | Izukawa |
| 6,400,907 | B1 | 6/2002 | Izukawa |
| 6,795,649 | B2 | 9/2004 | Murakami |
| 7,544,005 | B2 | 6/2009 | Senba et al. |
| 2001/0017740 | A1 | 8/2001 | Nomura et al. |
| 2004/0028400 | A1* | 2/2004 | Murakami .......... G03B 17/00 396/72 |
| 2004/0046890 | A1 | 3/2004 | Kikuchi et al. |
| 2004/0052515 | A1 | 3/2004 | Nishida et al. |
| 2004/0202464 | A1* | 10/2004 | Miyasaka ........... G03B 7/26 396/529 |
| 2004/0252991 | A1 | 12/2004 | Kawai et al. |
| 2005/0268000 | A1 | 12/2005 | Carlson |
| 2007/0077063 | A1 | 4/2007 | Tokiwa et al. |
| 2007/0126871 | A1 | 6/2007 | Henninger, III et al. |
| 2008/0304818 | A1 | 12/2008 | Kranz et al. |
| 2009/0269049 | A1 | 10/2009 | Ueda et al. |
| 2012/0063016 | A1 | 3/2012 | Imafuji et al. |

FOREIGN PATENT DOCUMENTS

| CN | 1940702 | A | 4/2007 |
|---|---|---|---|
| CN | 1984257 | A | 6/2007 |
| CN | 101075073 | A | 11/2007 |
| CN | 202102219 | U | 1/2012 |
| CN | 202102220 | U | 1/2012 |
| CN | 102385141 | A | 3/2012 |
| CN | 203241681 | U | 10/2013 |
| CN | 203241682 | U | 10/2013 |
| CN | 203241683 | U | 10/2013 |
| CN | 203275857 | U | 11/2013 |
| EP | 0262679 | A2 | 4/1988 |
| EP | 0262679 | A3 | 11/1988 |
| EP | 1672420 | A1 | 6/2006 |
| EP | 1852741 | A1 | 11/2007 |
| GB | 2158957 | A | 11/1985 |
| JP | 59-048742 | A | 3/1984 |
| JP | 62-032426 | A | 2/1987 |
| JP | 62-195633 | A | 8/1987 |
| JP | S62-195633 | A | 8/1987 |
| JP | 62-220937 | A | 9/1987 |
| JP | 01-302238 | A | 12/1989 |
| JP | 02-063030 | A | 3/1990 |
| JP | 02-163728 | A | 6/1990 |
| JP | 02-222934 | A | 9/1990 |
| JP | H02-222934 | A | 9/1990 |
| JP | 04-237008 | A | 8/1992 |
| JP | 05-181187 | A | 7/1993 |
| JP | 07-043773 | A | 2/1995 |
| JP | 07-114087 | A | 5/1995 |
| JP | 09-090488 | A | 4/1997 |
| JP | 09-211645 | A | 8/1997 |
| JP | 11-223865 | A | 8/1999 |
| JP | 11-346435 | A | 12/1999 |
| JP | 2000-047308 | A | 2/2000 |
| JP | 2001-034327 | A | 2/2001 |
| JP | 2002-341424 | A | 11/2002 |
| JP | 2004-069990 | A | 11/2002 |
| JP | 2004-069990 | A | 3/2004 |
| JP | 2004-117380 | A | 4/2004 |
| JP | 2004-361898 | A | 12/2004 |
| JP | 2005-043578 | A | 2/2005 |
| JP | 2005-055696 | A | 3/2005 |
| JP | 2005-115170 | A | 4/2005 |
| JP | 2005-157001 | A | 6/2005 |
| JP | 2007-101656 | A | 4/2007 |
| JP | 2007-171506 | A | 7/2007 |
| JP | 2007-241054 | A | 9/2007 |
| JP | 2009-093122 | A | 4/2009 |
| JP | 2009-288782 | A | 12/2009 |
| JP | 2010-117571 | A | 5/2010 |
| JP | 2010-152398 | A | 7/2010 |
| JP | 2010-282101 | A | 12/2010 |
| WO | 2009-048074 | A1 | 4/2009 |

OTHER PUBLICATIONS

Mar. 31, 2020 Chinese Office Action, with an English Translation, that issued in Chinese Patent Application No. 201810381227.3.

Oct. 1, 2013 Japanese Office Action, which was submitted in parent U.S. Appl. Nos. 13/856,652 and 15/345,661, without an English Translation, that issued in Japanese Patent Application No. 2013-049118.

Partial European Search Report dated Nov. 28, 2013, which was submitted in parent U.S. Appl. Nos. 13/856,652 and 15/345,661, that issued in the corresponding European Patent Application No. 13162293.

May 13, 2014 Japanese Office Action, which was submitted in parent U.S. Appl. Nos. 13/856,652 and 15/345,661, without an English Translation, that issued in Japanese Patent Application No. 2012-161142.

European Search Report dated Sep. 1, 2014, which was submitted in parent U.S. Appl. Nos. 13/856,652 and 15/345,661, that issued in the corresponding European Patent Application No. 13162293.8.

Jan. 20, 2015 Japanese Office Action, which was submitted in parent U.S. Appl. Nos. 13/856,652 and 15/345,661, without an English Translation, that issued in Japanese Patent Application No. 2013-052907.

Jun. 16, 2015 Chinese Office Action, which was submitted in parent U.S. Appl. Nos. 13/856,652 and 15/345,661, with an English Translation, that issued in Chinese Patent Application No. 201310119976.6.

Supplementary Partial European Search Report dated Nov. 18, 2015, which was submitted in parent U.S. Appl. Nos. 13/856,652 and 15/345,661, that issued in the corresponding European Patent Application No. 13772154.4.

(56) References Cited

OTHER PUBLICATIONS

European Search Report dated Dec. 3, 2015, which was submitted in parent U.S. Appl. Nos. 13/856,652 and 15/345,661, that issued in the corresponding European Patent Application No. 15171859.0.
U.S. Office Action dated Dec. 10, 2015, that issued in a related U.S. Appl. No. 13/856,555.
Chinese Office Action dated Jun. 29, 2016, which was submitted in parent U.S. Appl. Nos. 13/856,652 and 15/345,661, with an English Translation, that issued in Chinese Patent Application No. 201380017423.8.
U.S. Office Action dated Jul. 28, 2016, that issued in a related U.S. Appl. No. 14/389,865.
Jan. 31, 2017 Japanese Office Action, which was submitted in parent U.S. Appl. Nos. 13/856,652 and 15/345,661, without an English Translation, that issued in Japanese Patent Application No. 2014-033805.
U.S. Office Action dated Jun. 29, 2017, that issued in a related U.S. Appl. No. 13/856,555.
Chinese Office Action dated Sep. 4, 2017, which was submitted in parent U.S. Appl. Nos. 13/856,652 and 15/345,661, with an English Translation, that issued in Chinese Patent Application No. 201510994097.7.
Russian Office Action dated Nov. 27, 2017, which was submitted in parent U.S. Appl. Nos. 13/856,652 and 15/345,661, with an English Translation, that issued in the corresponding Russian Patent Application No. 2016139355.
Indian Office Action dated Jan. 10, 2018, which was submitted in parent U.S. Appl. Nos. 13/856,652 and 15/345,661, without an English Translation, that issued in the corresponding Indian Patent Application No. 1528/CHE/2013.
Feb. 24, 2018 Chinese Office Action, which was submitted in parent U.S. Appl. Nos. 13/856,652 and 15/345,661, with an English Translation, that issued in Chinese Patent Application No. 201610445738.8.
Indian Office Action dated Apr. 25, 2018, which was submitted in parent U.S. Appl. Nos. 13/856,652 and 15/345,661, with an English Translation, that issued in the corresponding Indian Patent Application No. 7903/CHENP/2014.
Jul. 25, 2018 Chinese Office Action, which was submitted in parent U.S. Appl. Nos. 13/856,652 and 15/345,661, with an English Translation, that issued in Chinese Patent Application No. 201510994097.7.
Oct. 2, 2018 Japanese Office Action, which was submitted in parent U.S. Appl. Nos. 13/856,652 and 15/345,661, with an English Translation, that issued in Japanese Patent Application No. 2017-086336.
Jan. 25, 2019 European Office Action, which was submitted in parent U.S. Appl. Nos. 13/856,652 and 15/345,661, that issued in European Patent Application No. 13162291.2.
Jun. 25, 2019 European Search Report, which was submitted in parent U.S. Appl. Nos. 13/856,652 and 15/345,661, that issued in European Patent Application No. 19168868.8.

* cited by examiner

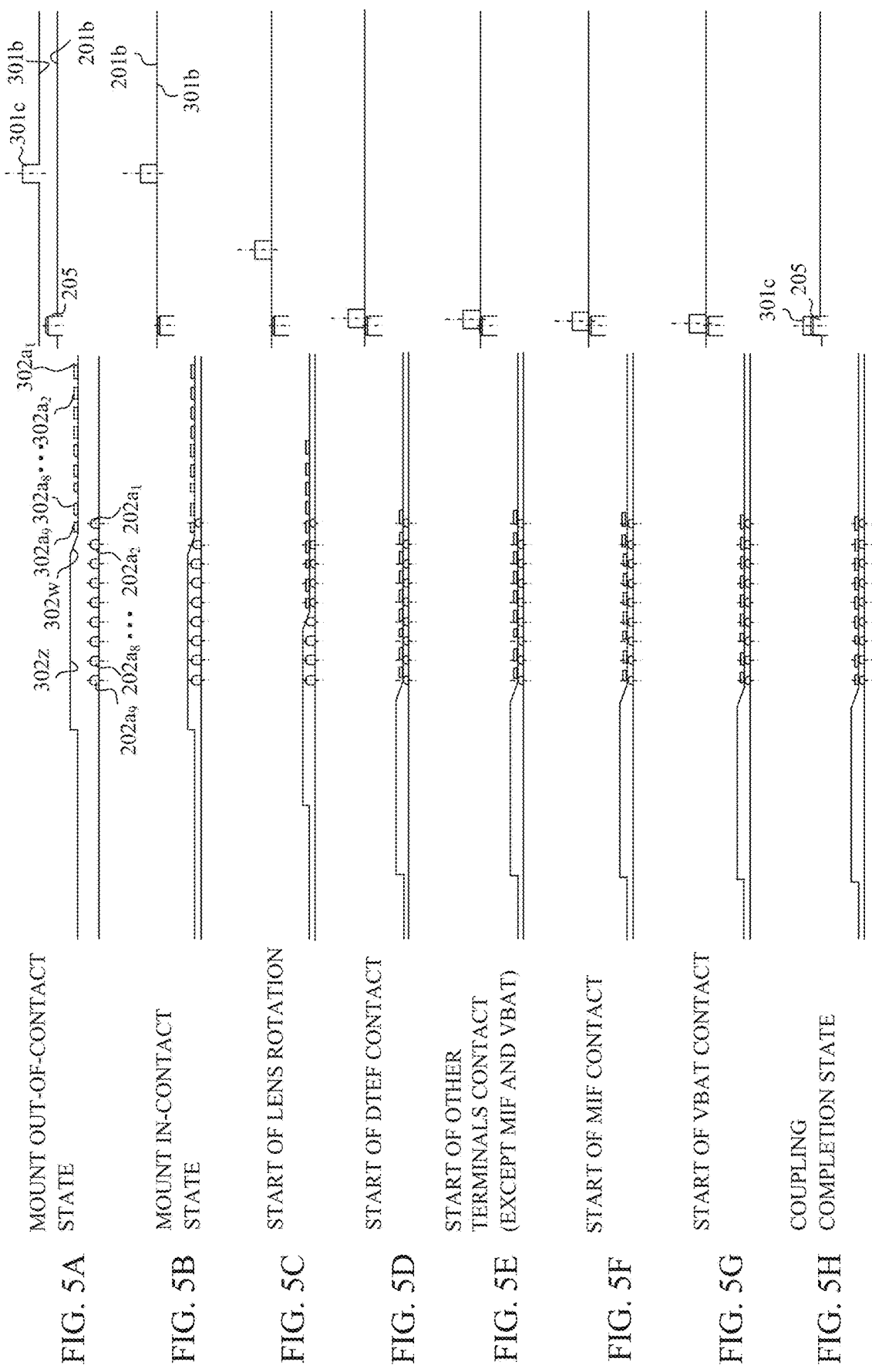

CAMERA AND CAMERA ACCESSORY

CROSS-REFERENCE TO RELATED APPLICATIONS

This application is a divisional of application Ser. No. 15/345,661, filed Nov. 8, 2016, which is a divisional of application Ser. No. 13/856,652, filed Apr. 4, 2013, which issued as U.S. Pat. No. 9,638,987 on May 2, 2017, the entire disclosures of which are hereby incorporated by reference.

BACKGROUND OF THE INVENTION

The present invention relates to a camera and a camera accessory interchangeably attachable to the camera such as an interchangeable lens.

Such camera accessories (each hereinafter simply referred to as "an accessory") receive, in a state of being attached to a camera, supply of power from the camera and perform communication of commands, data or the like with the camera. In order to perform such supply of power and communication, an attachment portion (mount) of the camera and that of the accessory are provided with multiple electrical contacts (each hereinafter simply referred to as "a contact") in which paired ones are brought into contact with each other to establish electrical connection. Moreover, as a method of the attachment (coupling) of the camera and the accessory, bayonet coupling is often used in which the mounts of the camera and accessory are relatively rotated to cause bayonet claws provided in the respective mounts to engage with each other.

Japanese Patent Laid-Open No. 62-195633 discloses a camera and an interchangeable lens as an accessory respectively having a camera side mount and a lens side mount that are coupled with each other by the bayonet coupling method. In a coupling completion state after relative rotation of the camera side and lens side mounts, each of multiple camera side contact pins provided in the camera side mount makes contact with corresponding each of multiple lens side contact pins (contact surfaces) provided in the lens side mount. The camera side contact pins and the lens side contact pins are respectively held by a camera side contact base provided in the camera side mount and by a lens side contact base provided in the lens side mount. The camera side contact base is provided with hole portions into which the camera side contact pins are inserted to be held thereby, and each camera side contact pin is biased in a direction of protruding from the hole portion (that is, in a protruding direction) by a contact spring disposed between the camera side contact pin and a printed wiring board placed at bottom of the hole portion. The lens side contact pins are fixedly held by the lens side contact base.

Recently, in order to reduce weight of the camera, its mount is produced by resin molding. Such a mount produced by resin molding is hereinafter referred to as "a molded mount". Furthermore, in order to reduce thickness of the camera, the contact spring biasing the camera side contact pin in the protruding direction is formed using a leaf spring.

In addition, the camera side and accessory (lens) side contact pins include: power supplying contact pins for supplying, from the camera to the accessory, source power to drive an actuator provided in the accessory; and controlling contact pins for sending and receiving, between the camera and the accessory, signals to control the accessory.

The camera and accessory each provided with such a mount (particularly, a molded mount) holding the contact pins have the following problems.

FIG. 19 shows falling of a camera 401 to ground 405; an interchangeable lens 402 as an accessory is attached to the camera 401. When the camera 401 falls to the ground 405, a front edge of the interchangeable lens 402 heavier in weight than the camera 401 is highly likely to first hit the ground 405. In this case, a maximum external force acting to a lowest portion of the mounts coupling the camera 401 and interchangeable lens 402 so as to tear the coupled mounts apart from each other is generated. Therefore, it is desirable to provide a bayonet claw in a phase including the lowest portion of each of the camera side and lens side mounts and to provide, in that phase, a fastening portion of each of the camera side and lens side mounts respectively fastened to a camera body (chassis of the camera 401) and a lens body (chassis of the interchangeable lens 402) by using a fastening screw.

However, providing the camera side contact pin to a same position as that of the fastening screw in a circumferential direction of the mount and using the leaf spring as the contact pin biasing the camera side contact pin in the protruding direction needs to increase a pitch of the camera side contact pins because it is necessary to dispose the leaf spring so as to avoid interference with the fastening screw. Such a configuration increases an angular range occupied by the camera side contact pins (that is, a contact occupied angular range) in the camera side mount, which impedes miniaturization of the camera.

On the other hand, the camera is provided with a motor as an actuator to drive a shutter or the like; the motor generates noise. The noise affects control of the accessory, which causes erroneous operation of the accessory.

In addition, wiring is made using a flexible board or the like from the power supply provided in the camera to the power supplying contact pin. However, a long length wiring is likely to increase electrical loss due to wiring resistance.

BRIEF SUMMARY OF THE INVENTION

The present invention provides a camera and a camera accessory whose contact occupied angular range in their mounts is small and whose size thereby can be reduced. Moreover, the present invention provides a camera and a camera accessory in which electrical loss due to wiring resistance is reduced and which have noise tolerance.

The present invention provides as one aspect thereof a camera to which a camera accessory is detachably attachable. The camera includes a camera side mount to be detachably coupled with an accessory side mount provided in the camera accessory, the camera side mount being provided with camera side bayonet claws and being brought, by relative rotation with the accessory side mount, from a first state in which each of accessory side bayonet claws provided in the accessory side mount is inserted between the camera side bayonet claws into a second state in which the camera side bayonet claws engage with the accessory side bayonet claws to complete coupling of the camera side and accessory side mounts, a camera side contact holding portion provided in the camera side mount, and a plurality of camera side contact pins arranged in a relative rotation direction of the accessory side and camera side mounts and held by the camera side contact holding portion so as to be movable in directions of protruding and retracting with respect to the camera side contact holding portion. The accessory side mount is provided with an accessory side contact holding portion and a plurality of accessory side contact surfaces arranged in the relative rotation direction and held by the accessory side contact holding portion, and the camera side contact pins make contact with the accessory side contact surfaces in the second state to electrically connect the camera with the camera accessory. Between the camera side mount and a body of the camera, a leaf spring is disposed which biases the camera side contact pins in the direction of protruding with respect to the camera side contact holding portion. When the camera being in a normal position is viewed from a direction facing the camera side mount and a line extending from a center of the camera side mount in a direction of gravity is defined as a mount center line, the leaf spring extends from both sides of the mount center line toward the camera side contact pins so as to come closer to the mount center line, and the camera side contact pins are arranged in the camera side contact holding portion at positions other than a position on the mount center line.

The present invention provides as another aspect thereof a camera to which a camera accessory is detachably attachable. The camera includes a camera side mount to be detachably coupled with an accessory side mount provided in the camera accessory, the camera side mount being provided with camera side bayonet claws and being brought, by relative rotation with the accessory side mount, from a first state in which each of accessory side bayonet claws provided in the accessory side mount is inserted between the camera side bayonet claws into a second state in which the camera side bayonet claws engage with the accessory side bayonet claws to complete coupling of the camera side and accessory side mounts, a camera side contact holding portion provided in the camera side mount, and a plurality of camera side contact pins arranged in a relative rotation direction of the accessory side and camera side mounts and held by the camera side contact holding portion so as to be movable in directions of protruding and retracting with respect to the camera side contact holding portion. The accessory side mount is provided with an accessory side contact holding portion and a plurality of accessory side contact surfaces arranged in the relative rotation direction and held by the accessory side contact holding portion, and the camera side contact pins make contact with the accessory side contact surfaces in the second state to electrically connect the camera with the camera accessory. When the camera being in a normal position is viewed from a direction facing the camera side mount and a line extending from a center of the camera side mount in a direction of gravity is defined as a mount center line, the camera is provided with a power supply circuit on one side with respect to the mount center line and with a camera side actuator on another side with respect thereto, of the camera side contact pins, a power supplying contact pin for supplying source power from the power supply circuit to the camera accessory is disposed on the one side, and number of the camera side contact pins disposed on the one side is greater than that of the camera side contact pins disposed on the other side.

The present invention provides as still another aspect thereof a camera accessory detachably attachable to a camera. The camera accessory includes an accessory side mount to be detachably coupled with a camera side mount provided in the camera, the accessory side mount being provided with accessory side bayonet claws and being brought, by relative rotation with the camera side mount, from a first state in which each of the accessory side bayonet claws is inserted between camera side bayonet claws provided in the camera side mount into a second state in which the accessory side bayonet claws engage with the camera side bayonet claws to complete coupling of the accessory side and camera side mounts, an accessory side contact holding portion provided in the accessory side mount, and a plurality of accessory side contact surfaces arranged in a relative rotation direction of the accessory side and camera side mounts and held by the accessory side contact holding portion. The camera side mount is provided with a camera side contact holding portion and a plurality of camera side contact pins arranged in the relative rotation direction and held by the camera side contact holding portion so as to be movable in directions of protruding and retracting with respect to the camera side contact holding portion, and the accessory side contact surfaces make contact with the camera side contact pins in the second state to electrically connect the camera accessory with the camera. In the camera, between the camera side mount and a body of the camera, a leaf spring is disposed which biases the camera side contact pins in the direction of protruding with respect to the camera side contact holding portion. When the camera being in a normal position is viewed from a direction facing the camera side mount and a line extending from a center of the camera side mount in a direction of gravity is defined as a camera side mount center line, the leaf spring extends from both sides of the camera side mount center line toward the camera side contact pins so as to come closer to the camera side mount center line, and the camera side contact pins are arranged in the camera side contact holding portion at positions other than a position on the camera side mount center line. When the camera accessory being in the second state with respect to the camera being in the normal position is viewed from a direction facing the accessory side mount and a line extending from a center of the accessory side mount in the direction of gravity is defined as an accessory side mount center line, the accessory side contact surfaces are arranged in the accessory side contact holding portion at positions other than a position on the accessory side mount center line.

The present invention provides as further another aspect thereof a camera accessory detachably attachable to a camera. The camera accessory includes an accessory side mount to be detachably coupled with a camera side mount provided in the camera, the accessory side mount being provided with accessory side bayonet claws and being brought, by relative rotation with the camera side mount, from a first state in which each of the accessory side bayonet claws is inserted between camera side bayonet claws provided in the camera side mount into a second state in which the accessory side bayonet claws engage with the camera side bayonet claws to complete coupling of the accessory side and camera side mounts, an accessory side contact holding portion provided in the accessory side mount, and a plurality of accessory side contact surfaces arranged in a relative rotation direction of the accessory side and camera side mounts and held by the accessory side contact holding portion. The camera side mount is provided with a camera side contact holding portion and a plurality of camera side contact pins arranged in the relative rotation direction and held by the camera side contact holding portion so as to be movable in directions of protruding and retracting with respect to the camera side contact holding portion, and the accessory side contact surfaces make contact with the camera side contact pins in the second state to electrically connect the camera accessory with the camera. When the camera being in a normal position is viewed from a direction facing the camera side mount and a line extending from a center of the camera side mount in a direction of gravity is defined as a camera mount center line, the camera is provided with a power supply circuit on one side with respect to the mount center line and with a camera side actuator on another side with respect thereto, and of the camera side contact pins, a power supplying contact pin for supplying source power from the power supply circuit to the camera accessory is disposed on the one side. When the camera accessory being in the second state with respect to the camera being in the normal position is viewed from a direction facing the accessory side mount and a line extending from a center of the accessory side mount in the direction of gravity is defined as an accessory side mount center line, of the accessory side contact surfaces, a power supplying contact surface making contact with the power supplying contact pin is disposed on the power supply circuit side with respect to the accessory side mount center line, and number of the accessory side contact surfaces disposed on the power supply circuit side with respect to the accessory side mount center line is greater than that of the accessory side contact surfaces disposed on a camera side actuator side with respect thereto.

The present invention provides as still further another aspect thereof a camera accessory including a mount to which a camera is connectable and which includes a circular portion, a hole portion to be used for locking connection of the camera accessory and the camera, and a plurality of contact surfaces arranged in a circumferential direction of the mount. The plurality of contact surfaces include a first contact surface to be used for a communication clock signal, a second contact surface to be used for outputting communication data to the camera connected to the camera accessory, and a third contact surface ($302a_1$) to be used for indicating type of the camera accessory. When a line extending from a center of the circular portion of the mount in a direction perpendicular to a line connecting the center of the circular portion of the mount and the hole portion is defined as a center line and the mount is viewed from a direction facing the mount, the center line is located between the first and second contact surfaces, and the first and third contact surfaces are located on a left side further than the center line.

The present invention provides as yet still further another aspect thereof a camera accessory including a mount to which a camera is connectable and which includes a circular portion and, a hole portion to be used for locking connection of the camera accessory and the camera, and a plurality of contact surfaces arranged in a circumferential direction of the mount. When a line extending from a center of the circular portion of the mount in a direction perpendicular to a line connecting the center of the circular portion of the mount and the hole portion is defined as a center line and the mount is viewed from a direction facing the mount, the plurality of contact surfaces are arranged at positions other than on the center line.

The present invention provides as further another aspect thereof a camera accessory including a mount to which a camera is connectable and which includes a circular portion, a hole portion to be used for locking connection of the camera accessory and the camera, and a plurality of contact surfaces arranged in a circumferential direction of the mount. The plurality of contact surfaces include a first contact surface to be used for a communication clock signal, a second contact surface to be used for outputting communication data to the camera connected to the camera accessory, and a third contact surface to be used for indicating type of the camera accessory. When a line extending from a center of the circular portion of the mount in a direction perpendicular to a line connecting the center of the circular portion of the mount and the hole portion is defined as a center line and the mount is viewed from a direction facing the mount, number of the contact surfaces located on a right side further than the center line is greater than that of the contact surfaces located on a left side further than the center line, and the first and third contact surfaces are located on the left side further than the center line.

The present invention provides as still further another aspect thereof a camera accessory including a mount to which a camera is connectable and which includes a circular portion, a hole portion to be used for locking connection of the camera accessory and the camera, and a plurality of contact surfaces arranged in a circumferential direction of the mount. When a line extending from a center of the circular portion of the mount in a direction perpendicular to a line connecting the center of the circular portion of the mount and the hole portion is defined as a center line and the mount is viewed from a direction facing the mount, number of the contact surfaces located on a right side further than the center line is greater than that of the contact surfaces located on a left side further than the center line.

The present invention provides as further another aspect thereof a camera including a mount to which a camera accessory is connectable and which includes a circular portion, a lock pin to be used for locking connection of the camera and the camera accessory, and a plurality of contact pins arranged in a circumferential direction of the mount. The plurality of contact pins include a first contact pin to be used for a communication clock signal, a second contact pin to be used for receiving communication data output from the camera accessory connected to the camera, and a third contact pin to be used for receiving indication of type of the camera accessory. When a line extending from a center of the circular portion of the mount in a direction perpendicular to a line connecting the center of the circular portion of the mount and the hole portion is defined as a center line and the mount is viewed from a direction facing the mount, (a) the center line is located between the first and second contact pins, and (b) the first and third contact surfaces are located on a right side further than the center line.

The present invention provides as yet further another aspect thereof a camera including a mount to which a camera accessory is connectable and which includes a circular portion, a lock pin to be used for locking connection of the camera and the camera accessory, and a plurality of contact pins arranged in a circumferential direction of the mount. The plurality of contact pins include a first contact pin to be used for a communication clock signal, a second contact pin to be used for receiving communication data output from the camera accessory connected to the camera, and a third contact pin to be used for receiving indication of type of the camera accessory. When a line extending from a center of the circular portion of the mount in a direction perpendicular to a line connecting the center of the circular portion of the mount and the hole portion is defined as a center line and the mount is viewed from a direction facing the mount, number of the contact surfaces located on a left side further than the center line is greater than that of the contact surfaces located on a right side further than the center line, and the first and third contact surfaces are located on the right side further than the center line.

Other aspects of the present invention will be apparent from the embodiments described below with reference to the drawings.

BRIEF DESCRIPTION OF THE DRAWINGS

FIGS. 5A to 5H show relationships of the connectors during a coupling process of the mounts in Embodiment 1.

DETAILED DESCRIPTION OF THE EMBODIMENTS

Exemplary embodiments of the present invention will be described below with reference to the accompanied drawings.

Embodiment 1

Figure 1A:
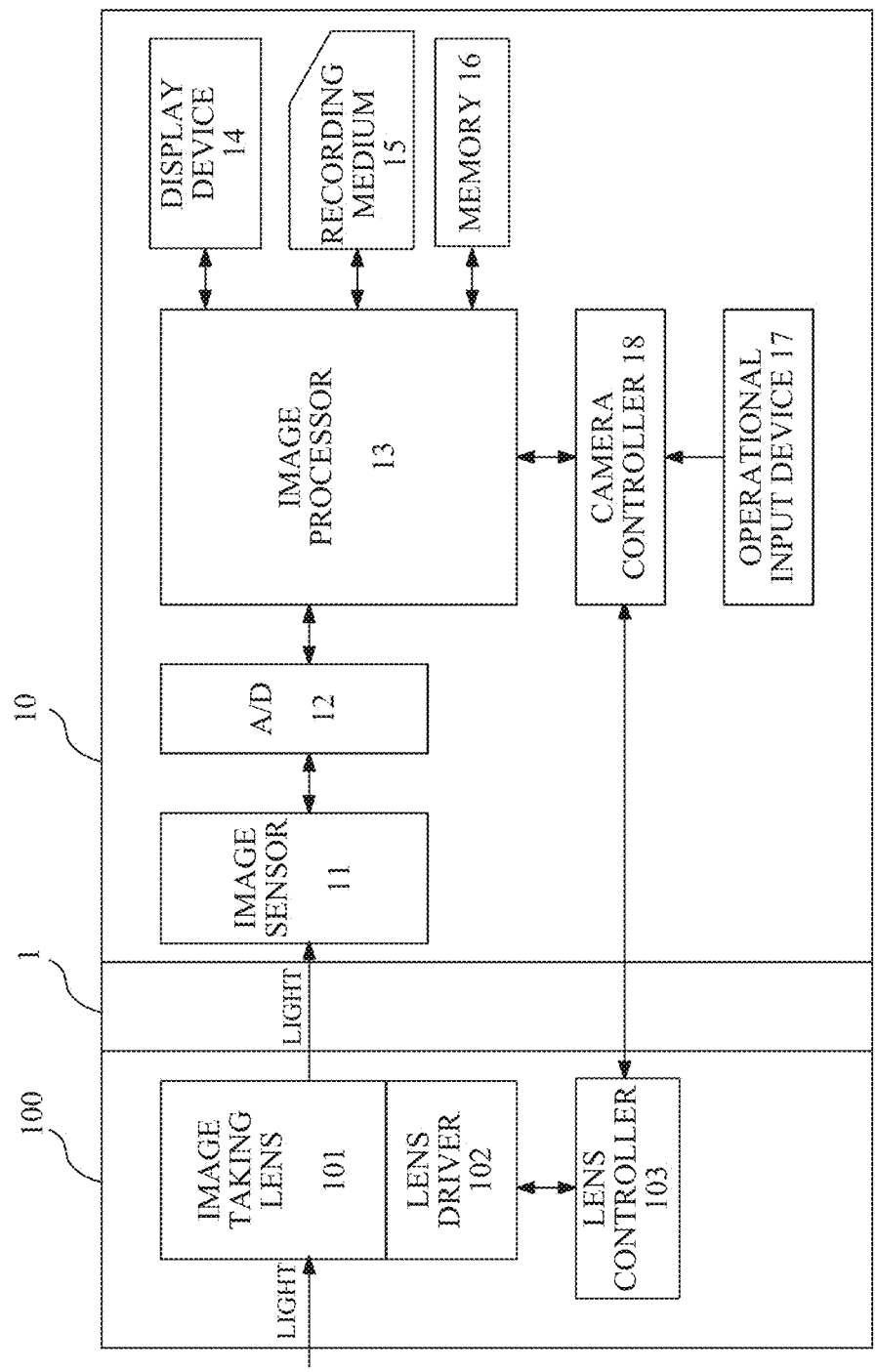
FIGS. 1A and 1B are block diagrams showing an electrical configuration of a camera and an interchangeable lens attached thereto, which are Embodiment 1 of the present invention.

FIG. 1A shows an interchangeable lens 100 as a camera accessory and a camera 10 to which the interchangeable lens 100 is detachably (that is, interchangeably) attached, which are Embodiment 1 of the present invention and constitute a camera system. The camera 10 and the interchangeable lens 100 each have a mount 1 provided with electrical contacts for supplying source power from the camera 10 to the interchangeable lens 100 and for performing communication therebetween. Although this embodiment describes the interchangeable lens as the camera accessory detachably attachable to the camera, other camera accessories are also included in other embodiments of the present invention.

The camera 10 includes an image sensor (image pickup element) 11 that photoelectrically converts an object image as an optical image formed by an image taking lens 101 housed in the interchangeable lens 100 and outputs an analog electrical signal. Moreover, the camera 10 includes an A/D converter 12 that converts the analog electrical signal output from the image sensor 11 into a digital signal and an image processor 13 that performs various image processes on the digital signal to produce an image signal. The image signal (still image or video) produced by the image processor 13 is displayed on a display device 14 or recorded in a recording medium 15.

The camera 10 further includes a memory 16 that serves as a buffer for performing the process on the image signal and stores operation programs to be used by a camera controller 18 described later. The camera 10 is additionally provided with an operational input device 17 that includes a power switch for switching power on and off, an image capturing switch for starting recording of the image signal and a selection/setting switch for performing setting in various menus. The camera controller 18 including a microcomputer controls the image processor 13 according to signals from the operational input device 17 and controls communication with the interchangeable lens 100.

On the other hand, the interchangeable lens 100 includes a lens driver 102 that drives actuators to move a focus lens, a zoom lens, an aperture stop and an image stabilizing lens included (but not shown) in the image taking lens 101. The interchangeable lens 100 is further provided with a lens controller 103 that includes a microcomputer and controls the lens driver 102 according to control signals from the camera controller 18 through the communication.

Figure 1B:
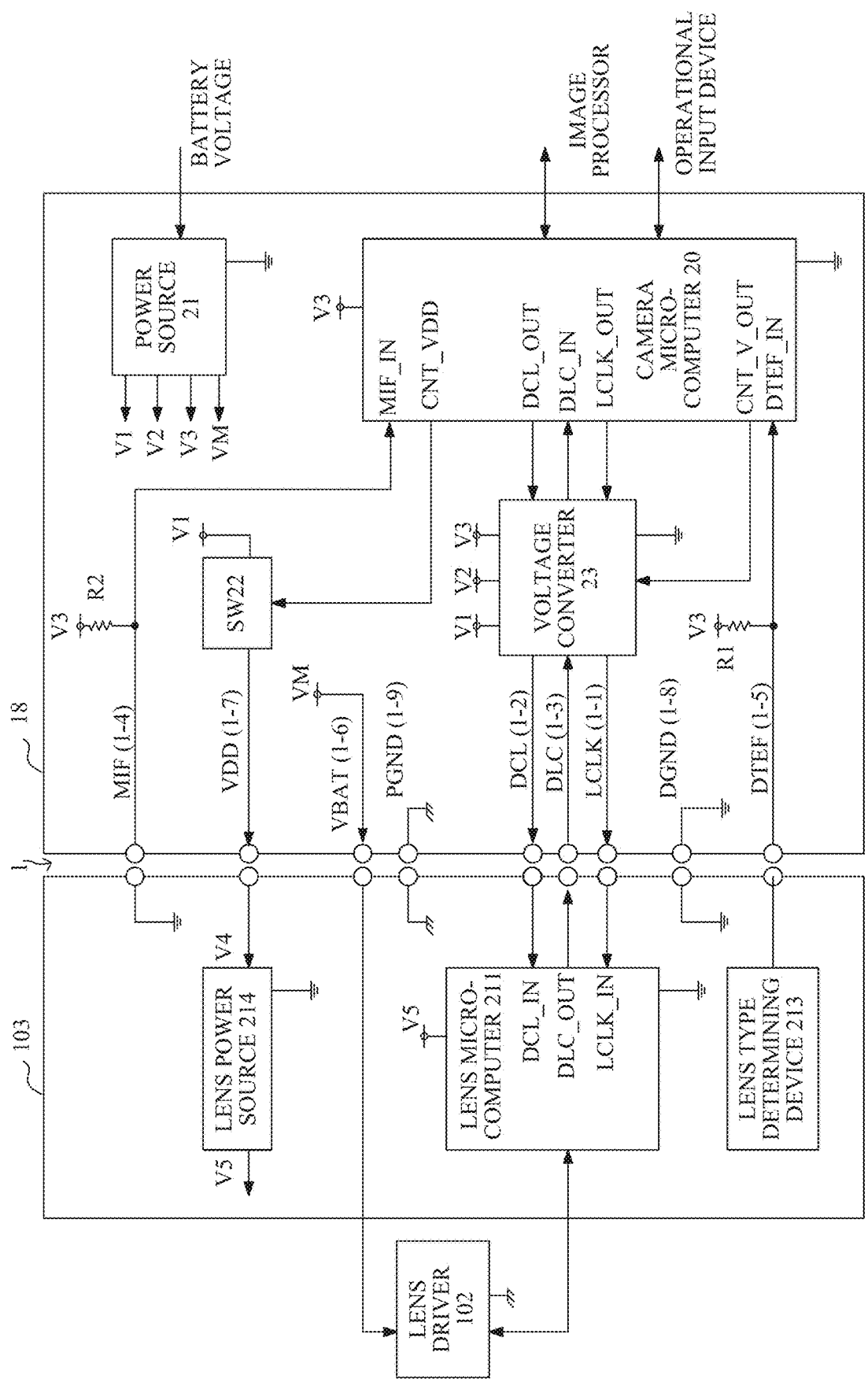

FIG. 1B shows terminals provided in the mount 1 for electrical connection of the camera 10 (camera controller 18) and the interchangeable lens 100 (lens controller 103).

An LCLK terminal (1-1) is a terminal for a communication clock signal output from the camera 10 to the interchangeable lens 100. A DCL terminal (1-2) is a terminal for communication data output from the camera 10 to the interchangeable lens 100. A DLC terminal (1-3) is a terminal for communication data output from the interchangeable lens 100 to the camera 10.

An MIF terminal (1-4) is a terminal for detecting attachment of the interchangeable lens 100 to the camera 10. The microcomputer (hereinafter referred to as "a camera microcomputer") 20 in the camera controller 18 detects that the interchangeable lens 100 is attached to the camera 10 on a basis of a voltage of the MIF terminal.

A DTEF terminal (1-5) is a terminal for detecting type of the interchangeable lens 100 attached to the camera 10. The camera microcomputer 20 detects (determines) the type of the interchangeable lens 100 attached to the camera 10 on a basis of a voltage of the DTEF terminal.

A VBAT terminal (1-6) is a terminal for supplying driving source power (VM) from the camera 10 to the interchangeable lens 100; the driving source power is used for various operations of the interchangeable lens 100 such as drive of various actuators, except communication control. A VDD terminal (1-7) is a terminal for supplying communication controlling source power (VDD) from the camera 10 to the interchangeable lens 100; the communication controlling source power is used for communication control in the interchangeable lens 100. A DGND terminal (1-8) is a terminal for connecting a communication control system of the camera 10 and interchangeable lens 100 to ground. A PGND terminal (1-9) is a terminal for connecting a mechanical drive system including the actuator such as a motor, which is provided in each of the camera 10 and the interchangeable lens 100, to the ground.

Description will hereinafter be made of a case where the camera 10 identifies, as the interchangeable lenses 100 of different types, a first interchangeable lens and a second interchangeable lens whose communication voltages are different from each other. The communication voltage will be described later.

A camera power supply 21 provided in the camera controller 18 converts a battery voltage supplied from a battery (not shown) included in the camera 10 into voltages necessary for operations of respective circuits in the camera 10. Specifically, the camera power supply 21 produces voltages V1, V2, V3 and VM.

The voltage V1 is a voltage as the communication controlling source power (VDD) of the first and second interchangeable lenses, and the communication voltage of the first interchangeable lens. The voltage V2 is the communication voltage of the second interchangeable lens. The voltage V3 is a voltage as an operating source power of the camera microcomputer 20. The voltage VM is, as mentioned above, a voltage as the driving source power of the actuators provided in the first and second interchangeable lenses. The voltage V1 is different from the voltage V2. On the other hand, the voltage V1 may be same as the voltage V3 or VM, and the voltage V2 may be same as the voltage V3 or VM (or may be different from both the voltages V3 and VM).

In response to turn-on of the power switch 22, the camera microcomputer 20 starts supply of the VDD and VM from the camera 10 to the interchangeable lens 100. In response to turn-off of the power switch 22, the camera microcomputer 20 ends the supply of the VDD and VM from the camera 10 to the interchangeable lens 100.

The camera microcomputer 20 performs communication with the interchangeable lens 100 through a voltage converter 23. The camera microcomputer 20 has an LCLK_OUT terminal for outputting a communication clock signal, a DCL_OUT terminal for sending communication data to the interchangeable lens 100 and a DLC_IN terminal for receiving communication data from the interchangeable lens 100. Moreover, the camera microcomputer 20 has an MIF_IN terminal for detecting the attachment of the interchangeable lens 100 to the camera 10, a DTEF_IN terminal for identifying the type of the attached interchangeable lens 100, and a CNT_V_OUT terminal for outputting a communication voltage switching signal to the voltage converter 23. The camera microcomputer 20 further has a CNT_VDD_OUT terminal for outputting a current-applying signal to the power switch 22, a connection terminal connected with the image processor 13 and another connection terminal connected with the operational input device 17. Operation of the voltage converter 23 will be described later.

A lens power supply 214 converts the VDD (V4) supplied from the camera 10 to the interchangeable lens 100 into a voltage V5. A microcomputer (hereinafter referred to as "a lens microcomputer") 211 in the lens controller 103 performs communication with the camera microcomputer 20 through the voltage converter 23. The lens microcomputer 211 has an LCLK_IN terminal for receiving the communication clock signal, a DLC_OUT terminal for sending the communication data to the camera 10, a DCL_IN terminal for receiving the communication data from the camera 10 and a connection terminal connected with the lens driver 102.

Description will be made of the detection of the attachment of the interchangeable lens (first and second interchangeable lenses) 100 to the camera 10. The MIF_IN terminal of the camera microcomputer 20 is pulled up to the source voltage by a resistance R2 (for example, 100KΩ) provided in the camera controller 18 and thereby becomes H (High) when the interchangeable lens 100 is not attached to the camera 10. On the other hand, the MIF_IN terminal is connected with the ground (GND) in the interchangeable lens 100 when the interchangeable lens (first and second interchangeable lenses) 100 is attached to the camera 10, and thereby becomes L (Low) at a point of time when the attachment of the interchangeable lens 100 is made, irrespective of the type of the attached interchangeable lens 100.

Figure 13A:
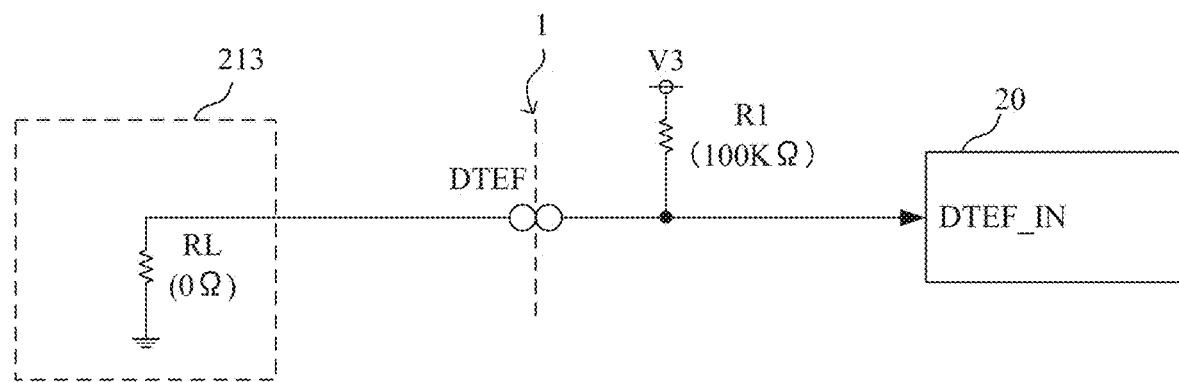
FIGS. 13A and 13B are block diagrams showing connection of lens type determining devices provided in first and second interchangeable lenses with a camera microcomputer in Embodiment 1.
Figure 13B:
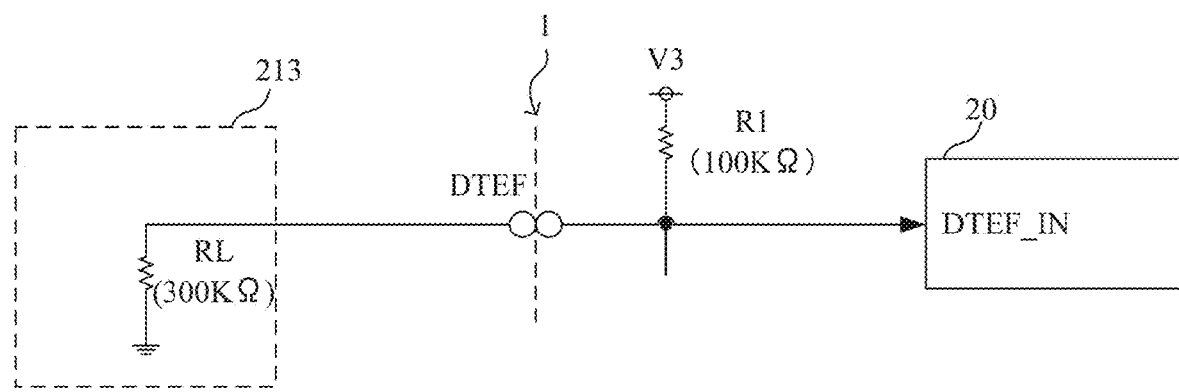

Description will be made of an exemplary configuration of the lens type determining device 213 provided in the lens controller 103 with reference to FIGS. 13A and 13B. The lens type determining device 213 is constituted by a resistance RL provided between the DTEF terminal in the mount 1 and the GND. A resistance value of the resistance RL is preset to a value assigned to the type of the interchangeable lens. For example, the resistance value of the resistance RL provided in the first interchangeable lens shown in FIG. 13A is set to 0Ω, and that of the resistance RL provided in the second interchangeable lens shown in FIG. 13B is set to 300KΩ.

In the camera 10, a resistance R1 (for example, 100KΩ) is connected between the DTEF terminal in the mount 1 and the voltage (V3) of the operating source power for the camera microcomputer 20, and the DTEF terminal is connected with the DTEF_IN terminal of the camera microcomputer 20. The DTEF_IN terminal of the camera microcomputer 20 is provided with an AD conversion function (10 Bit AD conversion function in this embodiment).

Description will be made of a lens type determination operation (hereinafter also referred to as "lens type determination") of the camera microcomputer 20 for determining the type of the interchangeable lens 100 attached to the camera 10. The camera microcomputer 20 performs the lens type determination on the basis of the voltage value input to the DTEF_IN terminal. Specifically, the camera microcomputer 20 performs AD conversion of the input voltage value and performs the lens type determination by comparing the AD converted value with lens type determination references stored in the camera microcomputer 20.

For example, when the first interchangeable lens is attached to the camera 10, the AD converted value of the voltage value input to the DTEF_IN terminal is decided, by a resistance ratio RL/(R1+RL) where R1 is 100KΩ and RL is 0Ω, as approximately "0x0000". The camera microcomputer 20 detects that the AD converted value obtained from the DTEF_IN terminal is within a range of "0x0000 to 0x007F", which is a first lens type determination reference, and thereby determines that the attached interchangeable lens is the first interchangeable lens. On the other hand, when the second interchangeable lens is attached to the camera 10, the AD converted value of the voltage value input to the DTEF_IN terminal is decided, by the resistance ratio RL/(R1+RL) where R1 is 100KΩ and RL is 300Ω, as approximately "0x02FF". The camera microcomputer 20 detects that the AD converted value obtained from the DTEF_IN terminal is within a range of "0x0280 to 0x037F", which is a second lens type determination reference, and thereby determines that the attached interchangeable lens is the second interchangeable lens.

Although the above description was made of the case where the resistance value of the resistance RL of the first interchangeable lens is 0Ω, a configuration may be employed which directly connects the DTEF_IN terminal with the GND.

Figure 14:
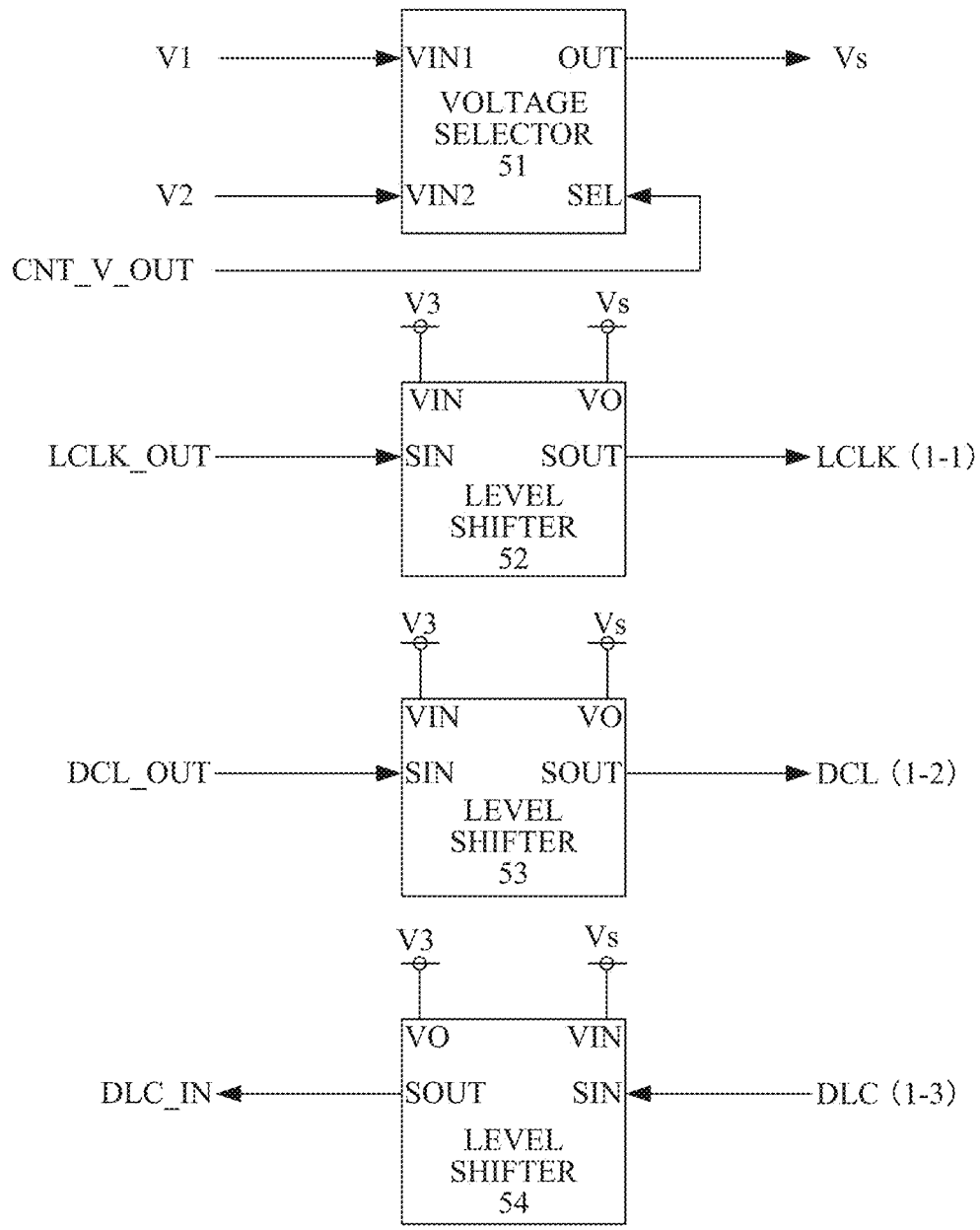
FIG. 14 is a block diagram showing a configuration of a voltage converter in Embodiment 1.

FIG. 14 shows an exemplary configuration of the voltage converter 23. A voltage selector 51 has a function of outputting, to an OUT terminal, any one of two voltages input to a VIN1 terminal and a VIN2 terminal according to a logic signal at an SEL terminal. Specifically, the voltage selector 51 outputs the voltage input to the VIN1 terminal when the input to the SEL terminal is L, and the voltage selector 51 outputs the voltage input to the VIN2 terminal when the input to the SEL terminal is H. The voltage V1 is connected to the VIN1 terminal, the voltage V2 is connected to the VIN2 terminal, and the CNT_V_OUT terminal of the camera microcomputer 20 is connected to the SEL terminal. The output of the OUT terminal is hereinafter referred to as "Vs".

Level shifters 52, 53 and 54 each have a function of converting a voltage of a signal input to an SIN terminal from a voltage at a VIN terminal into a voltage of a VOUT (VO in the figure) terminal and then outputting the converted voltage from an SOUT terminal.

In the level shifter 52, the SIN terminal is connected with the LCLK_OUT terminal of the camera microcomputer 20, and the SOUT terminal is connected with the LCLK terminal of the mount 1. Moreover, the VIN terminal is connected with V3 that is the same voltage as the operating source power voltage of the camera microcomputer 20, and the VOUT terminal is connected with $V_s$ output from the voltage selector 51. In the level shifter 53, the SIN terminal is connected with the DCL_OUT terminal of the camera microcomputer 20, and the SOUT terminal is connected with the DCL terminal of the mount 1. Moreover, the VIN terminal is connected with V3 that is the same voltage as the operating source power voltage of the camera microcomputer 20, and the VOUT terminal is connected with $V_s$ output from the voltage selector 51. In the level shifter 54, the SIN terminal is connected with the DLC terminal of the mount 1, and the SOUT terminal is connected with the DLC_IN terminal of the camera microcomputer 20. Moreover, the VIN terminal is connected with $V_s$ output from the voltage selector 51, and the VOUT terminal is connected with V3 that is the same voltage as the operating source power voltage of the camera microcomputer 20. Thus, $V_s$ (that is, V1 or V2) output from the voltage selector 51 is used as the communication voltage between the camera 10 and the interchangeable lens 100.

Description will be made of a voltage switching operation of the voltage converter 23. The camera microcomputer 20 controls the CNT_V_OUT terminal according to a logic table shown in Table 1.

Moreover, when detecting, as the voltage value (AD converted value) of the DTEF_IN terminal, a voltage out of the range of the above-mentioned first and second lens type determination references, the camera microcomputer 20 determines that the attached interchangeable lens is "a non-compliant lens" to which the camera 10 is not compliant or reserves the determination because of being unable to make a normal lens type determination. In these cases, the camera microcomputer 20 does not perform communication with the attached interchangeable lens 100.

Figure 15A:
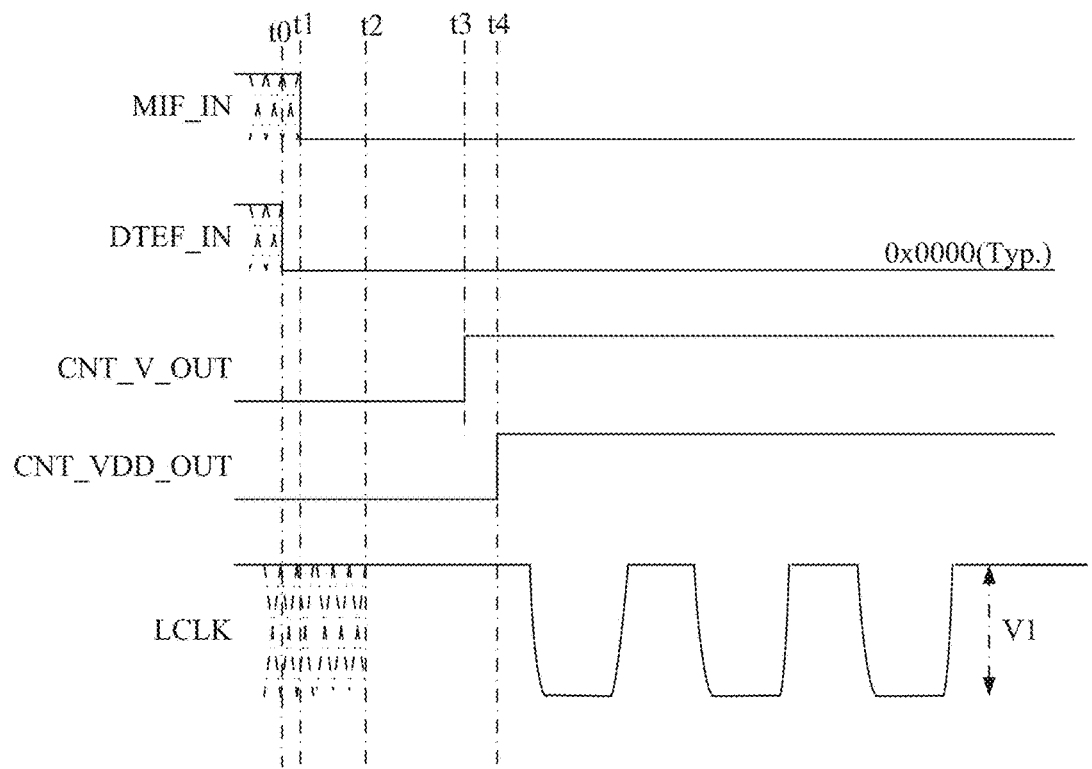
FIGS. 15A and 15B are timing charts showing examples of input and output timings of the camera microcomputer in Embodiment 1.
Figure 15B:
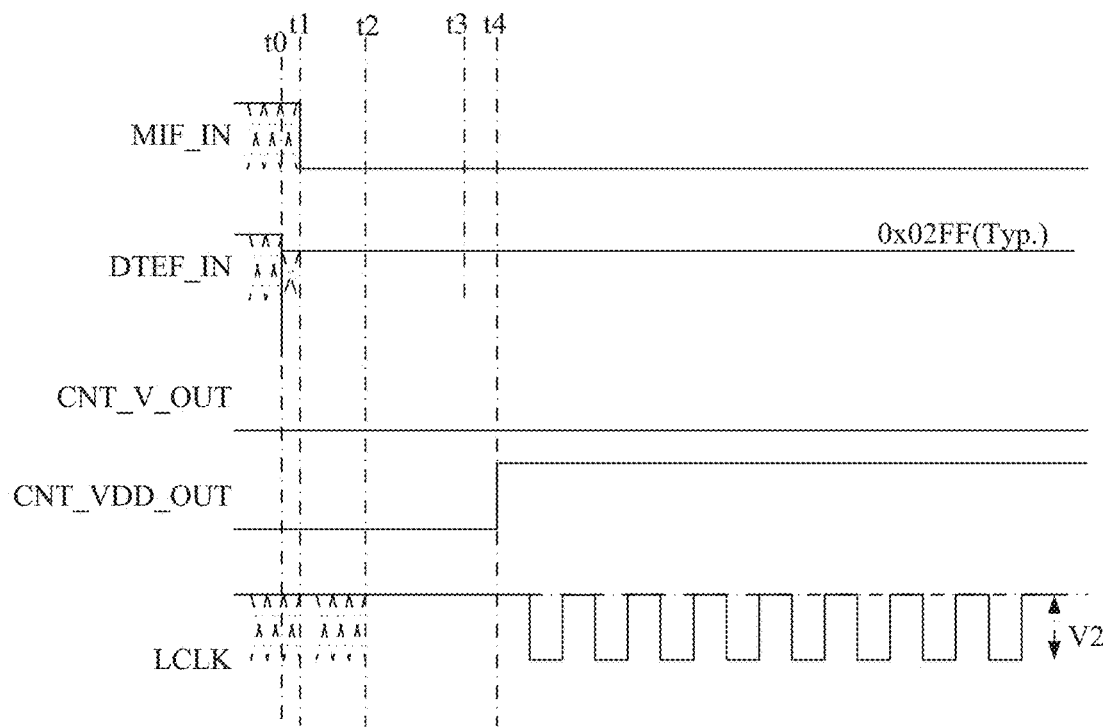

FIGS. 15A and 15B show exemplary input and output timings of the MIF_IN terminal, the DTEF_IN terminal, the CNT_V_OUT terminal, the CNT_VDD_OUT terminal of the camera microcomputer 20 and the LCLK terminal of the mount 1. FIG. 15A shows the input and output timings when the first interchangeable lens is attached to the camera 10, and FIG. 15B shows the input and output timings when the second interchangeable lens is attached to the camera 10. In these figures, t0 represents a time at which voltage input to the DTEF_IN terminal is made during the lens attachment, and t1 represents a time at which voltage input to the MIF_IN terminal is made during the lens attachment. Moreover, t2 represents a time at which the camera 10 is activated (power is turned on), t3 represents a time at which the lens type determination and the communication voltage setting are made, and t4 represents a time at which the power supply to the attached interchangeable lens 100 and the communication therewith are started. The time t0 may be identical to the time t1. Although the times at which the voltage input to the DTEF_IN terminal and the voltage input to the MIF_IN terminal are made are respectively, as described above, t0 and t1, the camera microcomputer 20 reads the voltage value of the DTEF_IN terminal after the MIF_IN terminal becomes L.

In both the cases where the first interchangeable lens is attached to the camera 10 and where the second interchangeable lens is attached thereto, the voltage input to the MIF_IN terminal is made (t1) after (or simultaneously with) the voltage input to the DTEF_IN terminal (t0). Then, after the camera 10 is activated (t2), the lens type determination and

TABLE 1

| LENS ATTACHED | FIRST INTERCHANGEABLE LENS | SECOND | RESERVED | NON-COMPLIANT LENS |
|---|---|---|---|---|
| DTEF_IN | 0x0000 ~0x007F | 0x0280 ~0x037F | 0x0080 ~0x027F | 0x0380 ~0x03FF |
| CNT_V_OUT | H | L | — | — |
| COMMUNICATION VOLTAGE | V1 | V2 | NO COMMUNICATION | |

As described above, the camera microcomputer 20 determines the type of the attached interchangeable lens 100 on the basis of the voltage value (AD converted value) input to the DTEF_IN terminal. Then, the camera microcomputer 20 controls a logic signal output from the CNT_V_OUT terminal depending on a result of the lens type determination of the attached interchangeable lens 100. Specifically, when determining from the voltage value of the DTEF_IN terminal that the attached interchangeable lens 100 is the first interchangeable lens, the camera microcomputer 20 outputs H from the CNT_V_OUT terminal to control the communication voltage to V1. On the other hand, when determining from the voltage value of the DTEF_IN terminal that the attached interchangeable lens 100 is the second interchangeable lens, the camera microcomputer 20 outputs L from the CNT_V_OUT terminal to control the communication voltage to V2.

the communication voltage setting depending on the result of the lens type determination are performed (t3). Thereafter, the power supply to the interchangeable lens 100 and the communication therewith are started (t4). When the interchangeable lens is attached to the camera 10 after the camera 10 is activated, though t2 is before t0 and t1, the voltage input to the MIF_IN terminal is performed after (or simultaneously with) the voltage input to the DTEF_IN terminal.

When such operation (or control) for the lens attachment is performed, irrespective of whether the attached interchangeable lens 100 is the first interchangeable lens or the second interchangeable lens, and irrespective of the camera activation time, it is necessary that the connection of the DTEF terminal in the mount 1 is made before (or simultaneously with) the connection of the MIF terminal. A reason therefor is as follows. As described above, the camera microcomputer 20 reads the voltage value of the DTEF_IN terminal after the MIF_IN terminal becomes L. If the connection of the DTEF terminal is not made even though the MIF_IN terminal became L, the determination that the attached interchangeable lens is the above-mentioned non-compliant lens, and the camera microcomputer 20 does not perform the communication with the interchangeable lens 100. Therefore, in order to determine the type of the attached interchangeable lens 100 and perform the communication using a proper communication voltage with the interchangeable lens 100, it is necessary that the connection of the DTEF terminal is certainly made at the time when the MIF_IN terminal becomes L.

Next, description will be made of a configuration of a camera side connector including camera side contact pins constituting camera side ones of the above-described terminals provided in the mount 1 and a lens side connector including lens side contact patterns (accessory side contact surfaces) constituting lens side ones thereof in the mount 1.

Figure 2A:
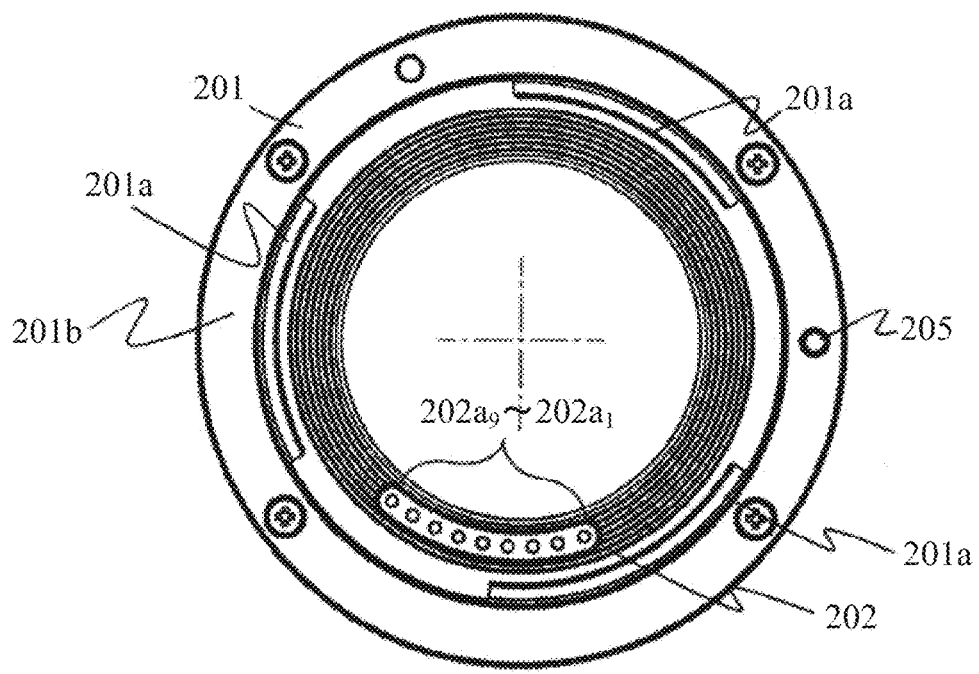
FIGS. 2A and 2B show configurations of mounts and connectors, which are provided in the camera and interchangeable lens of Embodiment 1.
Figure 2B:
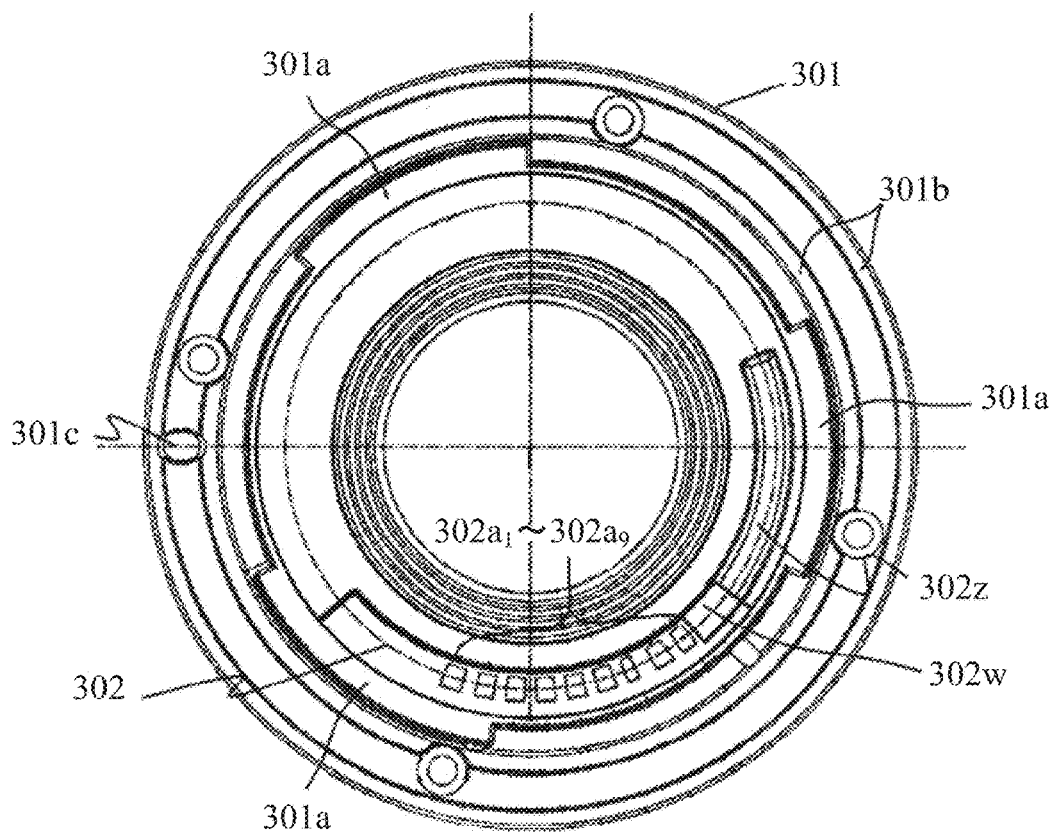
Figure 3A:
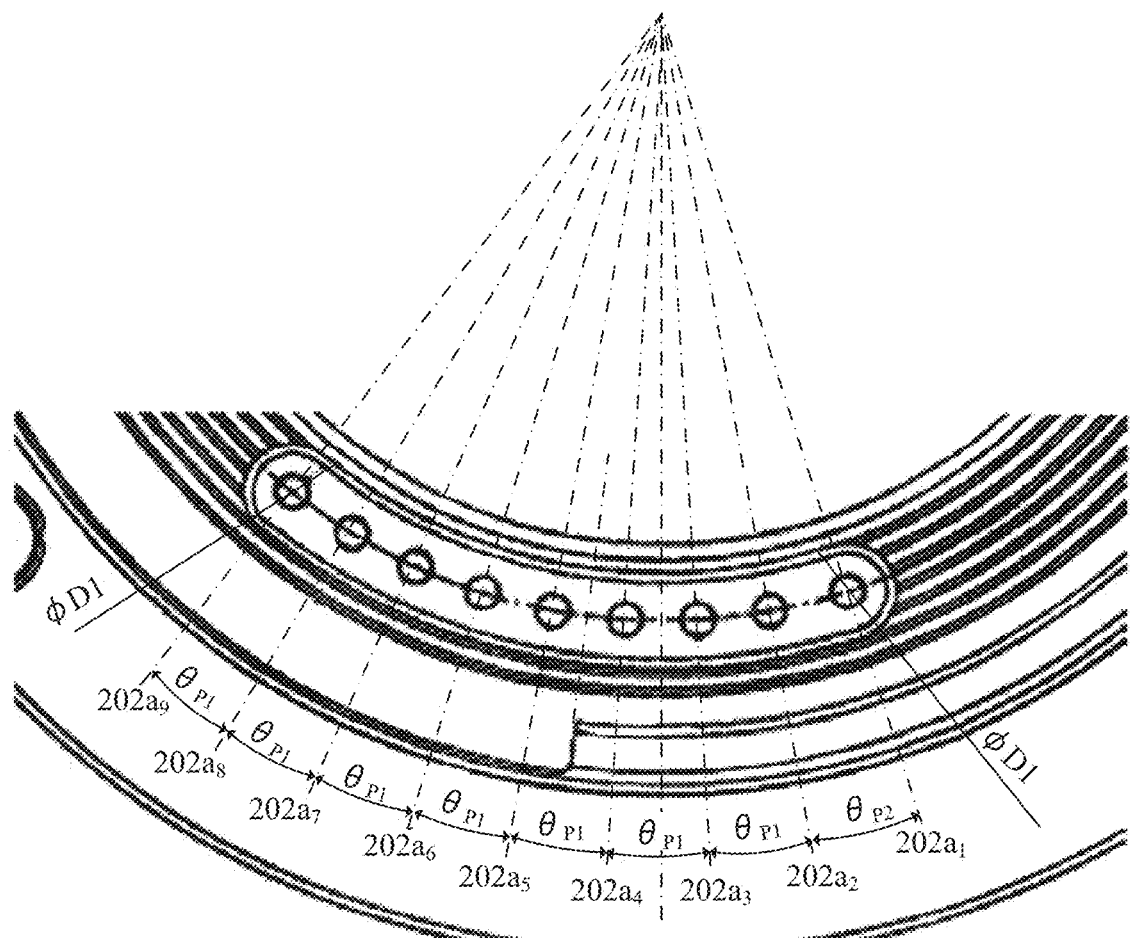
FIGS. 3A and 3B are enlarged views of the connectors.
Figure 3B:
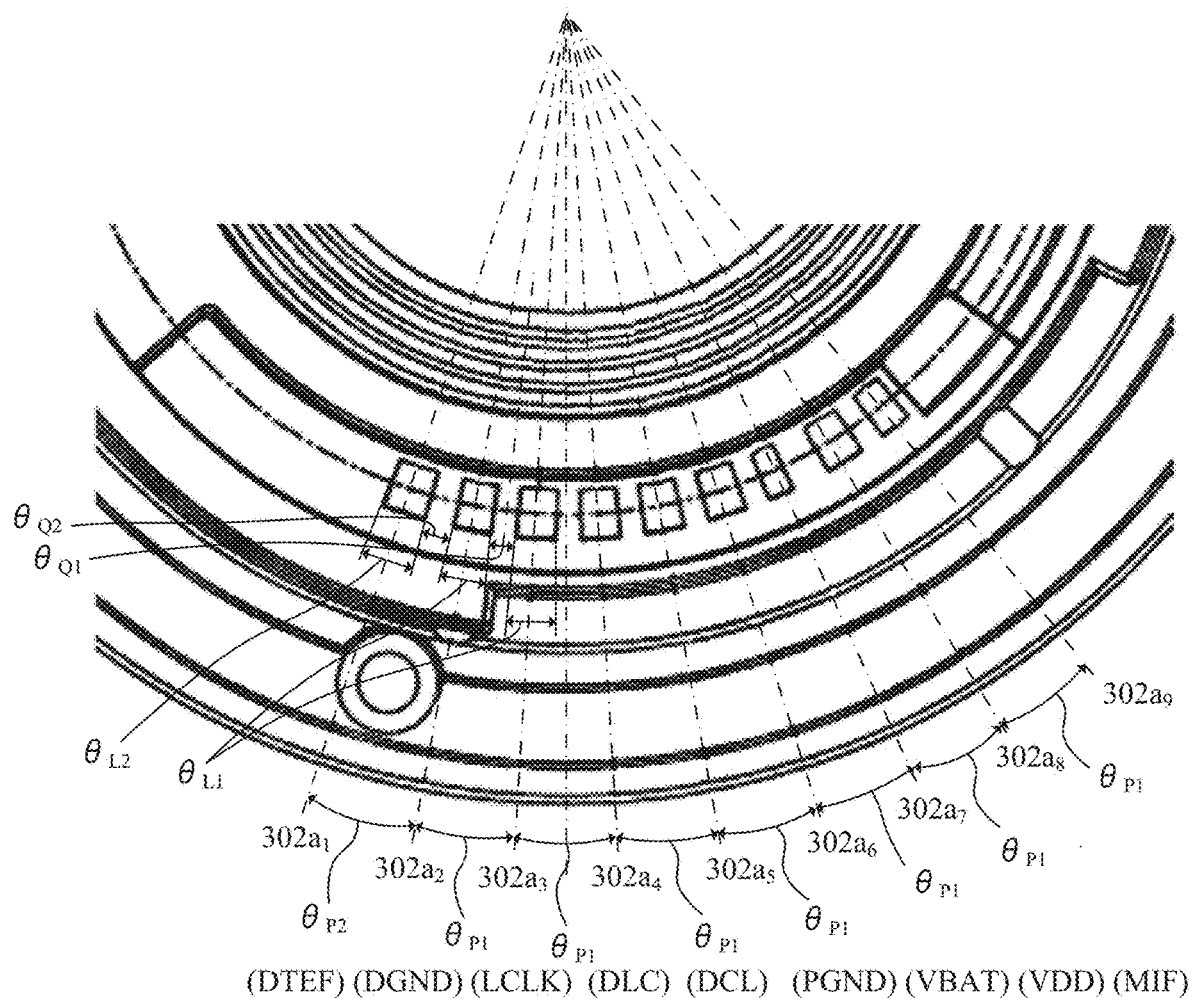
Figure 4:
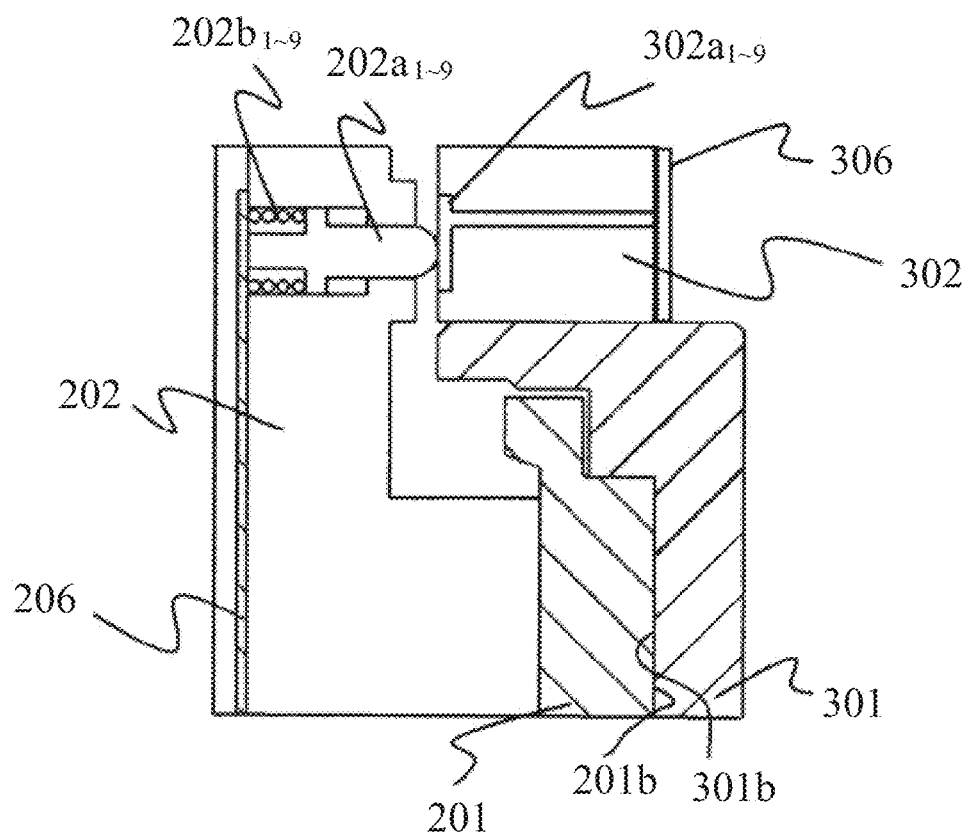
FIG. 4 is a cross-sectional view of the connectors.

FIG. 2A shows a camera side mount 201 viewed from a front side (object side) in an optical axis direction corresponding to a direction in which an optical axis of the image taking lens 101 extends. FIG. 3A is an enlarged view showing the camera side connector (constituted by a camera side contact base 202 and the camera side contact pins $202a_1$ to $202a_9$) provided in the camera side mount 201. FIG. 2B shows a lens side mount 301 viewed from a rear side (image plane side) in the optical axis direction. FIG. 3B is an enlarged view showing the lens side connector (constituted by a lens side contact base 302 and the lens side contact patterns $302a_1$ to $302a_9$) provided in the lens side mount 301. Moreover, FIG. 4 shows a cross section of the camera side connector and the lens side connector in the coupling completion state.

The camera side mount 201 is fixed at a front end portion of a camera body (not shown) as a chassis. The camera side mount 201 has, at its outer circumference side front end, a ring-shaped mount base surface 201*b* provided for securing a predetermined flange back, and also has, further inside than the mount base surface 201*b* at three places in its circumferential direction (hereinafter referred to as "a mount circumferential direction"), camera side bayonet claws 201*a*. Moreover, the camera side mount 201 is provided with a lock pin 205 for positioning of the camera side mount 201 and the lens side mount 301 in their relative rotational direction; the lock pin 205 is movable so as to protrude and retract with respect to the mount base surface 201*b*.

The lens side mount (accessory side mount) 301 is fixed to a rear end portion (not shown) of the interchangeable lens. The lens side mount 301 has, at its outer circumferential side rear end portion, a mount base surface 301*b* that is a reference surface in the optical axis direction, and has, further inside than the mount base surface 301*b* at three places in its circumferential direction (mount circumferential direction), lens side (accessory side) bayonet claws 301*a*. Moreover, the lens side mount 301 is provided with a lock hole portion 301*c* into which the lock pin 205 provided in the camera side mount 201 can be inserted; the lock hole portion 301*c* is formed so as to open at the mount base surface 301*b*. The lock hole portion 301*c* has, in the mount circumferential direction (that is, a relative rotation direction of the camera side and lens side mounts 201 and 301), an inner diameter that can engage with the lock pin 205 with almost no backlash, and has, in a radial direction (hereinafter referred to as "a mount radial direction") of the lens side mount 301, a longitudinal hole shape with an inner diameter larger than an outer diameter of the lock pin 205 to some degree. The longitudinal hole shape is provided in order to enable smooth insertion of the lock pin 205 into the lock hole portion 301*c* when the interchangeable lens 100 is attached to (relatively rotated with respect to) the camera 10.

In a partial area further inside than the bayonet claws 201*a* of the camera side mount 201, a camera side contact base (camera side contact holding portion) 202 that holds nine camera side contact pins $202a_1$, $202a_2$, ..., $202a_9$ arranged in the mount circumferential direction is formed. As shown in FIG. 4, the camera side contact pins $202a_1$ to $202a_9$ are inserted into pin holding hole portions formed in the camera side contact base 202 so as to independently protrude forward and retract rearward (that is, so as to be independently movable in protruding and retracting directions). At bottoms of the pin holding hole portions, a flexible printed wiring board 206 is disposed. Moreover, a contact spring ($202b_1$, $202b_2$, ..., $202b_9$) is disposed between the flexible printed wiring board 206 and a flange portion of each camera side contact pin ($202a_1$, $202a_2$, ..., $202a_9$); the contact spring biases the camera side contact pin so as to protrude it forward from the camera side contact base 202.

The camera side contact pins $202a_1$ to $202a_9$ are, in this order, connected with the DTEF terminal, the DGND terminal, the LCLK terminal, the DLC terminal, the DCL terminal, the PGND terminal, the VBAT terminal, the VDD terminal and the MIF terminal, described in FIG. 1B. The camera side contact pin $202a_2$ corresponds to a fifth camera side contact pin, the camera side contact pins $202a_4$ and $202a_5$ each correspond to an eighth camera side contact pin, the camera side contact pin $202a_6$ corresponds to a seventh camera side contact pin and the camera side contact pin $202a_8$ correspond to a fourth camera side contact pin.

The camera side contact base 202, the camera side contact pins $202a_n$ (n=1 to 9 and the same applies to the following description) and the contact springs $202b_n$ and the flexible printed wiring board 206 constitute the camera side connector.

In a partial area further inside than the bayonet claws 301*a* of the lens side mount 301, a lens side contact base (lens side contact holding portion) 302 that holds nine rectangular lens side contact patterns $302a_1$, $302a_2$, ..., $302a_9$ arranged in the mount circumferential direction is formed. The lens side contact pattern may have another shape than a rectangular shape, such as a circular shape.

The lens side contact patterns $302a_1$ to $302a_9$ are connected with the lens controller 103 shown in FIG. 1B via a flexible printed wiring board 306. In portions of the lens side contact base 302 adjacent to pattern holding portions that respectively hold the lens side contact patterns $302a_1$ to $302a_9$, recessed (concave) portions 302*z* that recess forward further than the pattern holding portions. Moreover, a slope 302*w* is formed between each pattern holding portion and each recessed portion 302*z* adjacent thereto. In the following description, the pattern holding portions in the lens side contact base 302 and the lens side contact patterns $302a_1$ to $302a_9$ are collectively referred to as "the lens side contact base 302".

The lens side contact patterns $302a_1$ to $302a_9$ correspond, in this order, to the camera side contact pins $202a_1$ to $202a_9$ connected with the DTEF terminal, the DGND terminal, the LCLK terminal, the DLC terminal, the DCL terminal, the PGND terminal, the VBAT terminal, the VDD terminal and the MIF terminal. The lens side contact pattern $302a_2$ corresponds to a fifth accessory side contact surface, the lens side contact patterns $302a_4$ and $302a_5$ each correspond to an eighth accessory side contact surface, the lens side contact pattern $302a_6$ corresponds to a seventh accessory side contact surface and the lens side contact pattern $302a_8$ correspond to a fourth accessory side contact surface.

The lens side contact base 302 (including the recessed portion $302z$ and the slope $302w$), the lens side contact patterns $302a_n$ (n=1 to 9 and the same applies to the following description) and the flexible printed wiring board 306 constitute the lens side connector.

The camera side contact pin $202a_n$ and the lens side contact pattern $302a_n$ are arranged at positions at which they make a pair with each other (that is, positions at which they make contact with each other) in the coupling completion state of the camera 10 and the interchangeable lens 100. At a time of the lens attachment, the lens side contact base 302 (including the lens side contact pattern $302a_n$ as mentioned above) coming in contact with the camera side contact pin $202a_n$ pushes this camera side contact pin $202a_n$ into the camera side contact base 202 with charging the contact spring $202b_n$. As a result, the camera side contact pin $202a_n$ makes contact with the corresponding (paired) lens side contact pattern $302a_n$ with pressure, and thereby electrical connection between the camera 10 and the interchangeable lens 100 is established.

FIGS. 5A to 5H show a process (states) in which the lens side connector is connected with the camera side connector during the lens attachment. In a right part of each of FIGS. 5A to 5H, a relationship between the lock pin 205 and the lock hole portion 301c in each state shown by each of FIGS. 5A to 5H.

FIG. 5A shows a state in which the lens side mount 301 is brought close to the camera side mount 201 in the optical axis direction to a position before each of the lens side bayonet claws 301a is inserted between the two camera side bayonet claws 201a. This state shown in FIG. 5A is hereinafter referred to as "a mount out-of-contact state". FIG. 5B shows a state in which each of the lens side bayonet claws 301a is inserted between the two camera side bayonet claws 201a and the lens side mount 301 (that is, the mount base surface 301b) is brought in contact with the camera side mount 201 (that is, the mount base surface 201b) in the optical axis direction. This state shown in FIG. 5B is hereinafter referred to as "a mount in-contact state (first state)".

FIGS. 5C to 5G show in a stepwise manner an intermediate state in which the lens side mount 301 is rotated with respect to the camera side mount 201 after the mount in-contact state toward the coupling completion state (second state). This state shown in FIGS. 5C to 5G is hereinafter referred to as "an intermediate rotation state". FIG. 5H shows a state in which the lens side mount 301 is rotated with respect to the camera side mount 201 to the coupling completion state.

In the mount in-contact state shown in FIG. 5B, the pattern holding portion (the lens side contact pattern $302a_9$ or a vicinity thereof) of the lens side contact base 302 makes contact with the camera side contact pin $202a_1$. As a result, the camera side contact pin $202a_1$ is pushed into the camera side contact base 202 as compared with the mount out-of-contact state shown in FIG. 5A.

Of the multiple (n) camera side contact pins $202a_n$, the camera side contact pin $202a_1$ for the DTEF terminal which makes contact with the lens side contact base 302 in the mount in-contact state is hereinafter referred to also as "a first camera side contact pin". On the other hand, the camera side contact pins $202a_2$ to $202a_9$ other than the first camera side contact pin, that is, the camera side contact pins that do not make contact with the lens side contact base 302 in the mount in-contact state are hereinafter each referred to also as "a second camera side contact pin". Of the multiple second camera side contact pins, the camera side contact pin $202a_9$ for the MIF terminal is a third camera side contact pin.

In the state of the mount in-contact state, the lock pin 205 is pushed by the mount base surface 301b of the lens side mount 301 at a position away from the lock hole portion 301c. Therefore, subsequent rotation of the lens side mount 301 with respect to the camera side mount 201 is allowed.

After the mount in-contact state shown in FIG. 5B, via the intermediate rotation state shown in FIGS. 5C to 5G and until reaching the coupling completion state, the lens side bayonet claws 301a and the camera side bayonet claws 201a completely engage with each other. During the intermediate rotation state, the lens side contact base 302 pushes also the second camera side contact pins $202a_2$ to $202a_9$ into the camera side contact base 202 while sliding with respect to these camera side contact pins $202a_1$ to $202a_9$. Thus, finally, in the coupling completion state shown in FIG. 5H, the paired camera side contact pin $202a_n$ and lens side contact pattern $302a_n$ make contact with each other with pressure.

Moreover, in the coupling completion state, since position of the lock pin 205 coincides with that of the lock hole portion 301c in the mount circumferential direction, the lock pin 205 protruding from the mount base surface 201b of the camera side mount 201 is inserted into the lock hole portion 301c of the lens side mount 301. Thereby, the coupling completion state is maintained until the lock pin 205 is pulled out from the lock hole portion 301c by a lock releasing mechanism (not shown).

Description will here be made of a process that the camera side contact pins $202a_n$ and the lens side contact patterns $302a_n$ make contact with each other during the intermediate rotation state shown in FIGS. 5D to 5G with reference to FIGS. 6A to 6D.

In the following description, a position on the lens side contact pattern $302a_n$ where the camera side contact pin $202a_n$ in the coupling completion state is referred to as "a pin contact position". A pitch of the lens side contact patterns $302a_1$ to $302a_9$ corresponds to a distance between the pin contact positions on the lens side contact patterns $302a_n$ and $302a_{n+1}$ adjacent to each other.

Moreover, a distance between the pin contact position on the lens side contact pattern $302a_n$ and a left end of the lens side contact pattern $302a_n$ in the figure (that is, an end in a direction in which the lens side contact pattern $302a_n$ is moved with respect to the camera side contact pin $202a_n$) is represented by $La_n$ ($La_1$ to $La_9$). The distances $La_1$ to $La_9$ are set to have the following relationship:

$$La_1 > La_2, La_3, La_4, La_5, La_6, La_8 > La_9 > La_7.$$

This relationship can be reworded, for example, as follows with focusing on the lens side contact patterns $302a_1$ and $302a_9$ and the camera side contact pins $202a_1$ and $202a_9$. A distance in the mount circumferential direction between a portion, of the lens side contact pattern $302a_1$, where the contact with the camera side contact pin $202a_1$ starts in the intermediate rotation state and a portion, of the lens side contact pattern $302a_9$, where the contact with the camera side contact pin $202a_9$ starts in the intermediate rotation state is represented by $L_A$. The wording "the portion where the contact starts" means, when the contact pattern has a rectangular shape, a side of the rectangular contact pattern, and when the contact pattern has a circular shape, an apex of a circular arc of the circular contact pattern. The distance in the mount circumferential direction can be also said as an angle. Furthermore, a distance (angle) in the mount circumferential direction between (central axes of) the camera side contact pins $202a_1$ and $202a_9$ is represented by $L_B$. The distance $L_A$ is shorter than the distance $L_B$ (in other words, the distance $L_B$ is longer than the distance $L_A$).

Figure 6A:
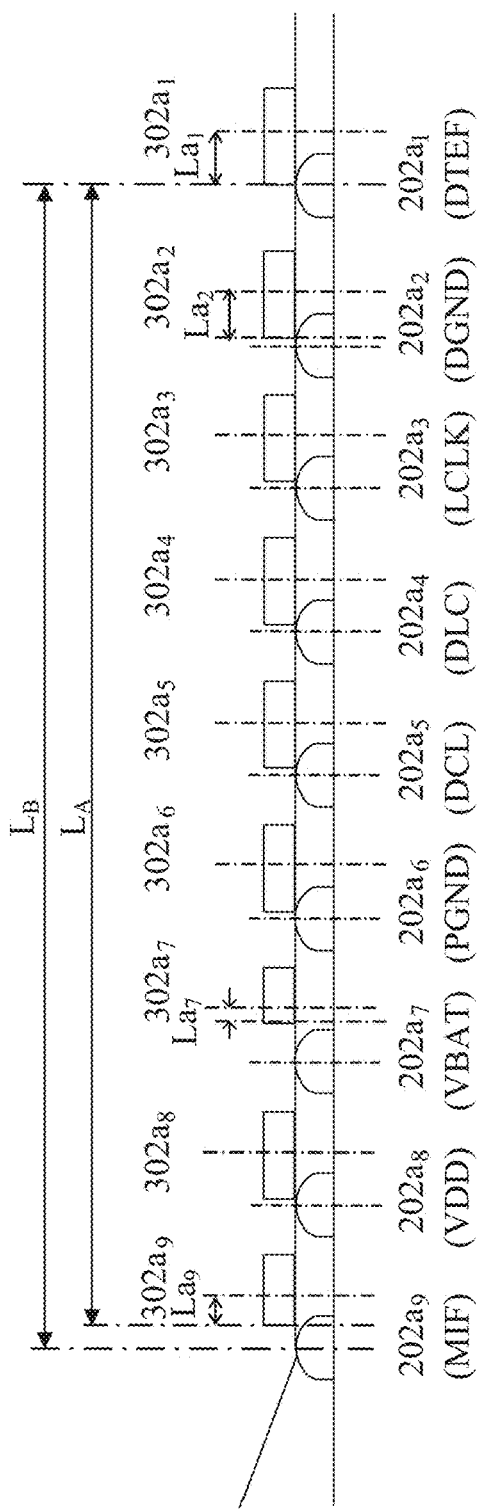
FIGS. 6A to 6E are enlarged views of FIGS. 5D to 5H.

When the lens side mount 301 is rotated from the state shown in FIG. 5C, the paired camera side contact pin (DTEF terminal pin) $202a_1$ and lens side contact pattern (DTEF terminal pattern) $302a_1$ start their contact with each other as shown in FIG. 6A. At this point, since $La_1$ to $La_9$ (that is, $L_A$ and $L_B$) have the above-mentioned relationship, the other paired camera side contact pin ($202a_2$ to $202a_9$) and lens side contact pattern ($302a_2$ to $302a_9$) do not make contact with each other.

Figure 6B:
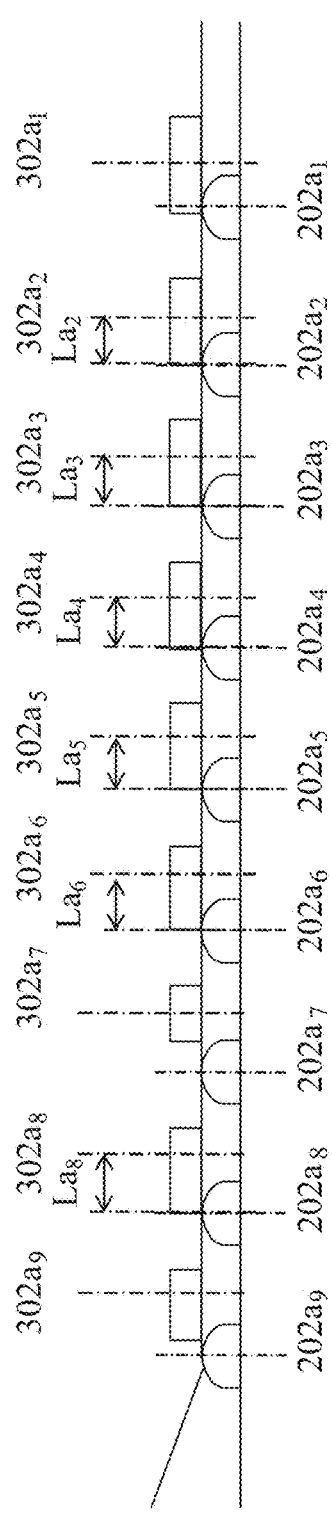

When the lens side mount 301 is further rotated from the state shown in FIG. 6A, the paired camera side contact pin ($202a_2$ to $202a_6$ and $202a_8$) and lens side contact pattern ($302a_2$ to $302a_6$ and $302a_8$) simultaneously start their contact with each other as shown in FIGS. 6B and 5E. At this point, the paired camera side contact pin ($202a_7$ and $202a_9$) and lens side contact pattern ($302a_7$ and $302a_9$) do not make contact with each other.

Figure 6C:
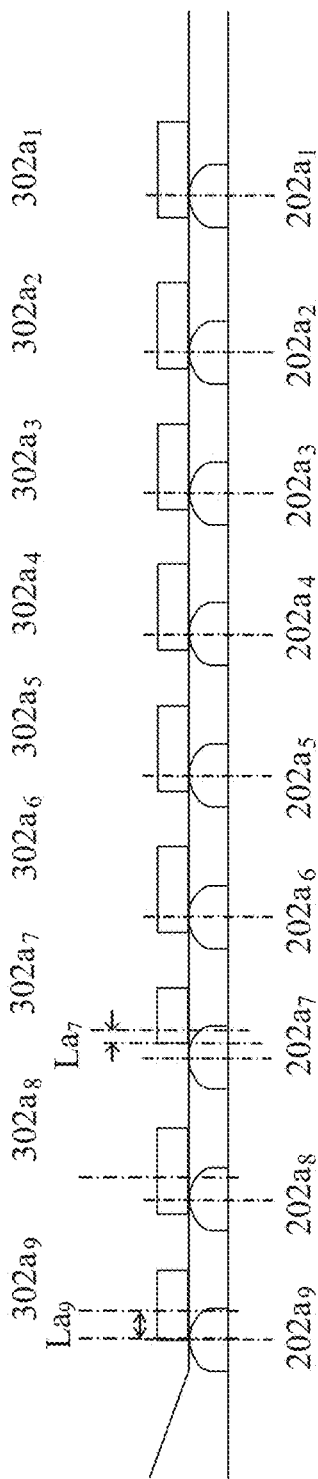

When the lens side mount 301 is further rotated from the state shown in FIG. 6B, the paired camera side contact pin (MIF terminal pin) $202a_9$ and lens side contact pattern (MIF terminal pattern) $302a_9$ start their contact with each other as shown in FIGS. 6C and 5F. At this point, since $La_9$ and $La_7$ have the following relationship:

$$La_9 > La_7,$$

the paired camera side contact pin $202a_7$ and lens side contact pattern $302a_7$ do not make contact with each other.

Figure 6D:
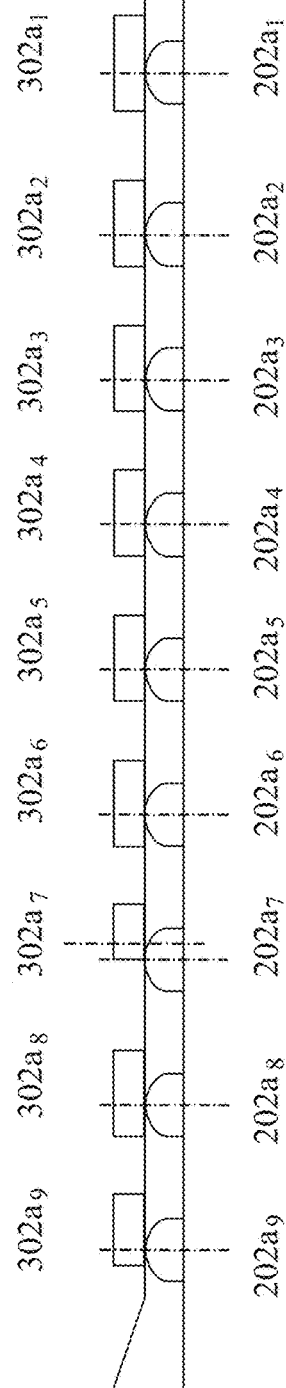

When the lens side mount 301 is further rotated from the state shown in FIG. 6C, the paired camera side contact pin (VBAT terminal pin) $202a_7$ and lens side contact pattern (VBAT terminal pattern) $302a_7$ start their contact with each other as shown in FIGS. 6D and 5G.

Figure 6E:
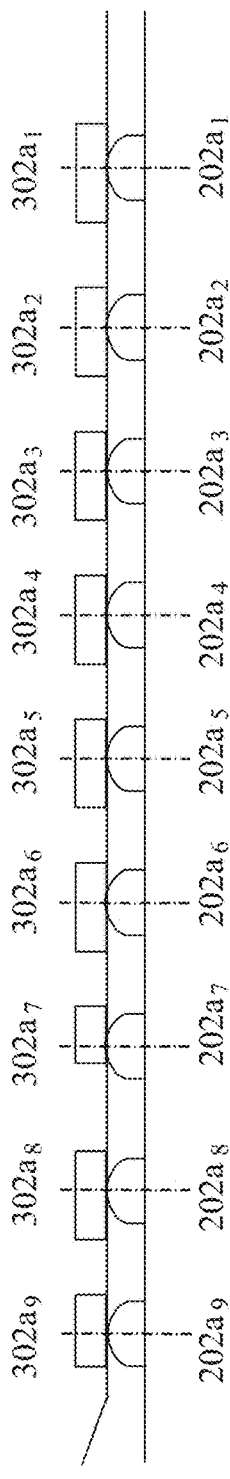

Then, when the lens side mount 301 is further rotated from the state shown in FIG. 6D, the lens and camera side mounts 301 and 201 reach the coupling completion state as shown in FIGS. 6E and 5H.

As described above, the order in which the paired camera side contact pin and lens side contact pattern make contact with each other is a descending order of the distance $La_n$, and therefore the paired camera side contact pin $202a_1$ and lens side contact pattern $302a_1$ constituting the DTEF terminal first start their contact with each other.

The distance $L_A$ and the distance $L_B$ may be equal to each other. In this case, it is desirable to increase the distance $L_A$ so as to cause it to coincide with the distance $L_B$ such that a timing at which the DTEF terminal pin and the DTEF terminal pattern make contact with each other coincides with a timing at which the DTEF terminal pin and the DTEF terminal pattern make contact with each other. With this distance stetting, a width of the lens side contact pattern $302a_1$ in the mount circumferential direction may be increased on an opposite side portion (right portion in FIGS. 6A to 6E) to the portion where the contact with the camera side contact pin starts. In the case where the distance $L_A$ and the distance $L_B$ are equal to each other, when the lens side mount 301 is rotated from the state shown in FIG. 5C, the camera side contact pins (DTEF and MIF terminal pins) $202a_1$ and $202a_9$ and the lens side contact patterns $302a_1$ and $202a_9$ corresponding thereto simultaneously start their contact.

Next, description will be made of problems relating to the first camera side contact pin $202a_1$ and a solution thereof. If the lens side mount 301 makes hard contact with the camera side mount 201 when these mounts 301 and 201 reach the mount in-contact state from the mount out-of contact state, the lens side contact base 302 strongly hits the first camera side contact pin $202a_1$. The first camera side contact pin $202a_1$ is inserted movably (that is, with an engaging gap allowing its movement) into the pin holding hole portion formed in the camera side contact base 202. Thus, impact due to the hit is likely to cause tilt or deformation (such as bending) of the first camera side contact pin $202a_1$ from a position nearly straightly extending in the optical axis direction, according to the engaging gap between the first camera side contact pin $202a_1$ and the pin holding hole portion. In this case, even though the mounts 301 and 201 reach the coupling completion state, the first camera side contact pin $202a_1$ does not make normal contact with the lens side contact pattern $302a_1$ pairing therewith, which may cause communication error between the camera and the interchangeable lens or power supply short-circuiting.

Thus, in this embodiment, a width in the mount circumferential direction and a height in the mount radial direction of the lens side contact pattern $302a_n$, a pitch and an interval of the lens side contact patterns $302a_n$, a pitch of the camera side contact pins $202a_n$ and a diameter of the camera side contact pin $202a_n$ are set as follows.

[The Width and Height of the Lens Side Contact Pattern (Accessory Side Contact Surface)]

Figure 7A:
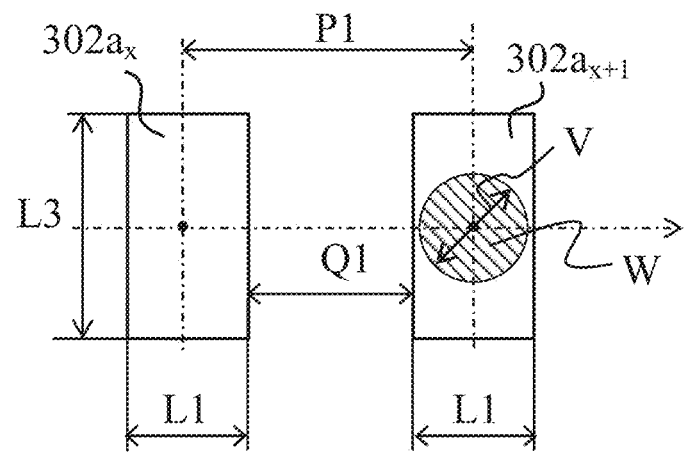
FIGS. 7A and 7B shows lens side contact patterns in Embodiment 1.
Figure 8A:
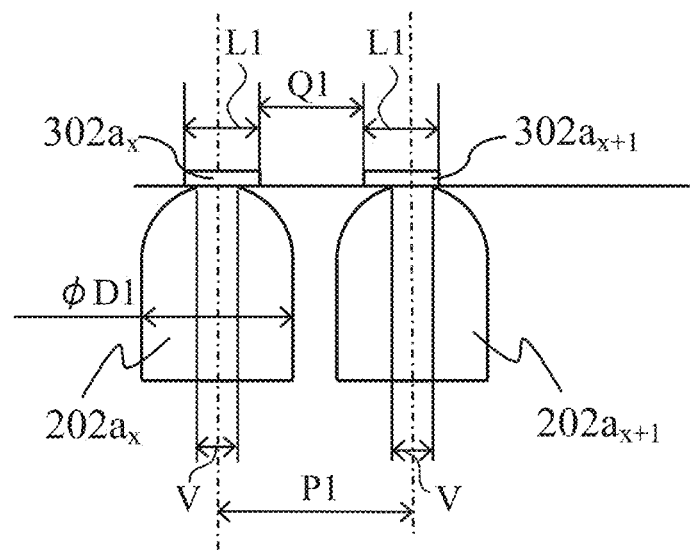
FIGS. 8A and 8B show camera side contact pins in a coupling completion state of the mounts in Embodiment 1.

The lens side contact patterns $302a_2$ to $302a_9$ respectively pairing with (or corresponding to) the second camera side contact pins $202a_2$ to $202a_9$ are hereinafter referred to as "second lens side contact patterns" (second accessory side contact surfaces). The second lens side contact patterns $302a_2$ to $302a_9$ are contact surfaces that do not make contact with the first camera side contact pin $202a_1$ in the coupling completion state. The lens side contact pattern $302a_9$ for the MIF terminal corresponds to a third accessory side contact surface. The width of these second lens side contact patterns $302a_2$ to $302a_9$ is set to L1 as shown in FIGS. 7A and 8A. In FIGS. 7A and 8A, the second camera side contact pin is denoted by $202a_x$, and the second camera side contact pins adjacent to each other are denoted by $202a_x$ and $202a_{x+1}$. Moreover, the second lens side contact pattern corresponding to the second camera side contact pin $202a_x$ is denoted by $302a_x$, and the second lens side contact patterns adjacent to each other are denoted by $302a_x$ and $302a_{x+1}$.

The width L1 is set, as shown in FIG. 8A, to be larger by a predetermined margin than a diameter V of a pin contact area W of the second lens side contact pattern $302a_x$ with which the second camera side contact pin $202a_x$ nearly straightly extending in the optical axis direction without being deformed makes contact. A tip of the second camera side contact pin $202a_x$ is worn away by repeated sliding of the tip with respect to the lens side contact patterns at times of the lens attachment and detachment. Therefore, the pin contact area W where the second camera side contact pin $202a_x$ makes contact is set in consideration of this wear. The diameter V is a width (diameter) of a portion of the tip of the second camera side contact pin $202a_x$, portion which makes contact with the second lens side contact pattern $302a_x$.

Moreover, the height of the second lens side contact pattern $302a_x$ is set to L3 as shown in FIG. 7A.

Figure 7B:
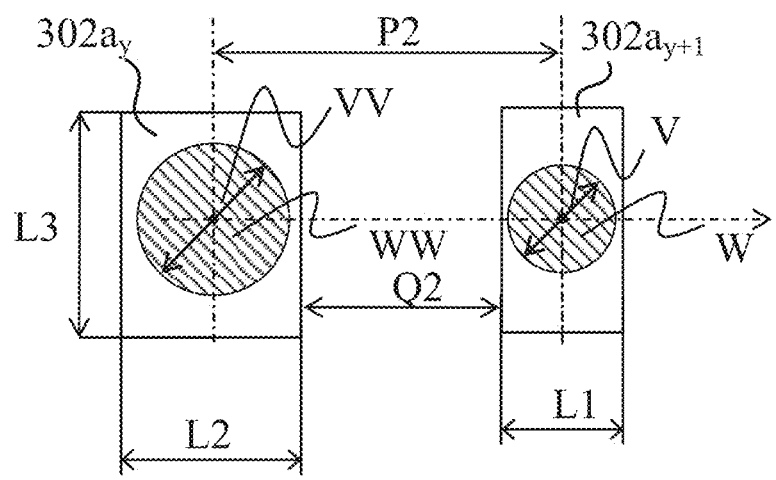
Figure 8B:
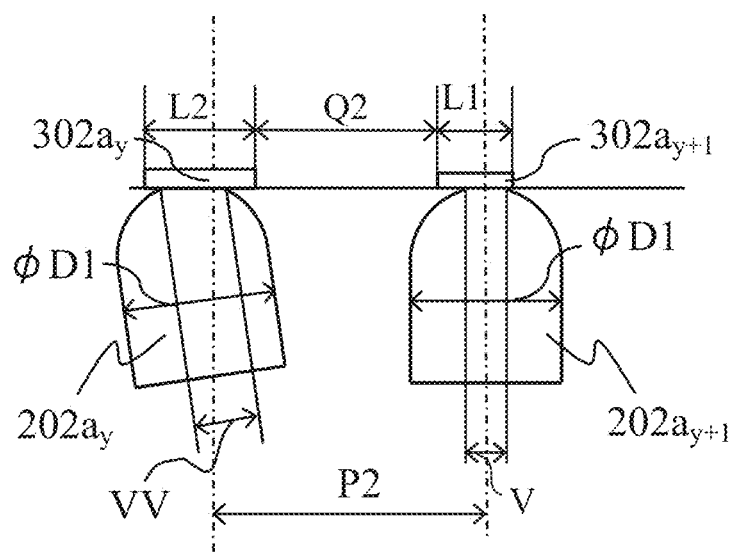

On the other hand, the lens side contact pattern $302a_1$ pairing with (or corresponding to) the first camera side contact pin $202a_1$ is hereinafter referred to as "a first lens side contact pattern" (first accessory side contact surface). The width of the first lens side contact pattern $302a_1$ is set to L2 larger than L1 as shown in FIGS. 7B and 8B. In FIGS. 7B and 8B, the first camera side contact pin is denoted by $202a_y$, and the first and second camera side contact pins adjacent to each other are denoted by $202a_y$ and $202a_{y+1}$. Moreover, the first lens side contact pattern corresponding to the first camera side contact pin $202a_y$ is denoted by $302a_y$, and the first and second lens side contact patterns adjacent to each other are denoted by $302a_y$ and $302a_{y+1}$.

FIG. 8B shows the first camera side contact pin $202a_y$ whose tip is displaced by tilt or deformation of the pin $202a_y$ from its original position nearly straightly extending in the optical axis direction. The width L2 is set, as shown in FIG. 8B, to be larger by a predetermined margin than a diameter VV of a possible pin contact area WW of the first lens side contact pattern $302a_y$. The possible pin contact area WW corresponds to a possible displacement amount (designed value) of the tip of the first camera side contact pin $202a_y$. For example, the possible pin contact area WW is an area where, if the first camera side contact pin $202a_y$ is deformed such that the tip thereof exceeds this area, a determination of failure or abnormality is made.

The tip of the first camera side contact pin $202a_y$ is also worn away by repeated sliding of the tip with respect to the lens side contact patterns at the times of the lens attachment and detachment. Therefore, the possible pin contact area WW, of the first lens side contact pattern $302a_y$, where the first camera side contact pin $202a_y$ is likely to make contact is set in consideration of this wear. The diameter VV is a width (diameter) of a portion of the tip of the first camera side contact pin $202a_y$, portion which makes contact with the first lens side contact pattern $302a_y$.

Moreover, the height of the first lens side contact pattern $302a_y$ is set to L3 that is same as the height of the second lens side contact pattern $302a_x$ as shown in FIG. 7B. Although this embodiment describes the case where the height L3 of each lens side contact pattern is larger than the widths L1 and L2, the height L3 may be equal to the width L1 or L2, and may be smaller than the width L1 or L2.

Furthermore, although FIGS. 7A and 7B schematically show that the pin contact position is located at an approximate center of the lens side contact pattern in the mount diameter and circumferential directions, the pin contact position is not limited thereto. In this embodiment, as shown in FIG. 6E, each pin contact position is located at an off-center position of the lens side contact pattern in the mount diameter direction.

As described above, in this embodiment, the width of the first lens side contact pattern $302a_y$ corresponding to the first camera side contact pin $202a_y$ in which tilt or deformation is likely to be caused is set to be larger than that of the second lens side contact pattern $302a_x$ corresponding to the second camera side contact pin $202a_x$ in which such tilt and deformation is not caused. Thereby, if the tilt or deformation is caused in the first camera side contact pin $202a_y$ ($202a_1$) due to the contact (hit) of the lens side contact base 302 to the first camera side contact pin $202a_y$, normal contact (electrical connection) of the second camera side contact pin $202a_y$ and the first lens side contact pattern $302a_y$ ($302a_1$) is secured, and thereby can prevent the communication error between the camera 10 and the interchangeable lens 100 and the power source short-circuiting.

FIG. 3B shows the widths L1 and L2 as angular range $\theta_{L1}$ and $\theta_{L2}$ on the lens side contact base 302 formed into a circular arc shape in the lens side mount 301.

[The Pitch and Interval of the Lens Side Contact Patterns (Accessory Side Contact Surfaces) and the Pitch of the Camera Side Contact Pins]

The pitch and interval of the second lens side contact patterns $302a_x$ and $302a_x+1$ ($302a_2$ to $302a_9$) are respectively set to P1 and Q1 as shown in FIGS. 7A and 8A. The pitch of the lens side contact patterns in this embodiment is a distance in the mount circumferential direction between the pin contact positions on the lens side contact patterns adjacent to each other. Moreover, the interval of the lens side contact patterns is a distance in the mount circumferential direction between one lens side contact pattern and the lens side contact pattern adjacent thereto (between sides of the rectangular contact patterns). The interval of the lens side contact patterns has an important implication for the contact of the lens side contact pattern and the camera side contact pin. Moreover, the pitch of the second camera side contact pins $202a_x$ and $202a_{x+1}$ (that is, a distance between center axes of these pins) is also set to P1 so as to coincide with the pitch P1 of the second lens side contact patterns $302a_x$ and $302a_{x+1}$.

The pitch P1 and interval Q1 are decided so as to satisfy the following conditions in addition to a precondition that a pin contact area of the second lens side contact pattern $302a_x$ where the second camera side contact pin $202a_x$ makes contact is W.

Figure 9A:
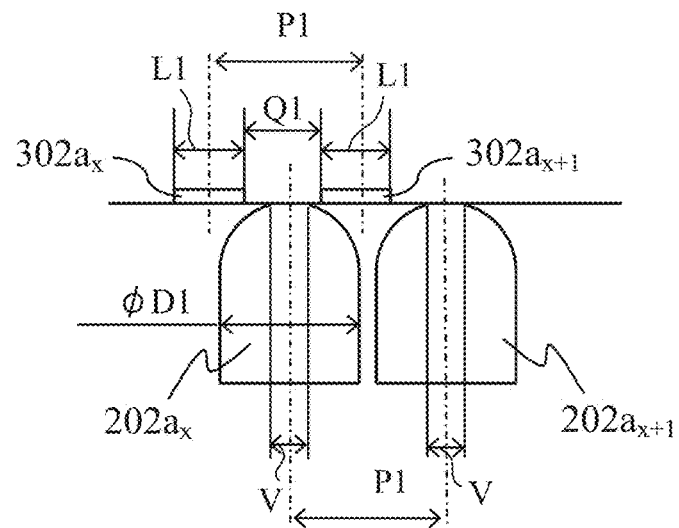
FIGS. 9A to 9C show the camera side contact pins in an intermediate rotation state of the mounts in Embodiment 1.

As a first condition, as shown in FIG. 9A, it is necessary that one second camera side contact pin $202a_x$ does not simultaneously make contact with the second lens side contact patterns $302a_x$ and $302a_{x+1}$ adjacent to each other during the rotation of the interchangeable lens for the lens attachment and detachment. That is, it is necessary to set the interval Q1 to be larger than a width V of the pin contact area W (Q1>V).

As a second condition, it is necessary that one second lens side contact pattern $302a_{x+1}$ does not simultaneously make contact with the second camera side contact pins $202a_x$ and $202a_{x+1}$ adjacent to each other.

As a third condition, it is necessary to satisfy the above-mentioned first and second conditions even if the distance between the second lens side contact patterns $302a_x$ is narrowed due to positional error thereof.

Satisfaction of the first to third conditions makes it possible to prevent failures, such as the power source short-circuiting, caused by simultaneous conduction of the mutually adjacent second lens side contact patterns $302a_x$ and $302a_{x+1}$ or the mutually adjacent second camera side contact pins $202a_x$ and $202a_{x+1}$.

On the other hand, the pitch and interval of the first lens side contact pattern $302a_y$ ($302a_1$) and the second lens side contact pattern $302a_{y+1}$ ($302a_2$) are respectively set to P2 and Q2 that are respectively larger than P1 and Q1, as shown in FIGS. 7B and 8B. The pitch of the first and second camera side contact pins $202a_y$ and $202a_{y+1}$ (that is, a distance between center axes of these pins) is also set to P2 so as to coincide with the pitch P2 of the first and second lens side contact patterns $302a_y$ and $302a_{y+1}$.

The pitch P2 and interval Q2 are decided on a basis of a precondition that the possible pin contact area of the first lens side contact pattern $302a_y$ where the first camera side contact pin $202a_y$ makes contact is WW larger than W. Therefore, the pitch P2 and interval Q2 are decided on a basis of another precondition that the width of the first lens side contact pattern $302a_y$ is L2 larger than L1. Furthermore, the pitch P2 and interval Q2 are decided so as to satisfy the following conditions.

Figure 9B:
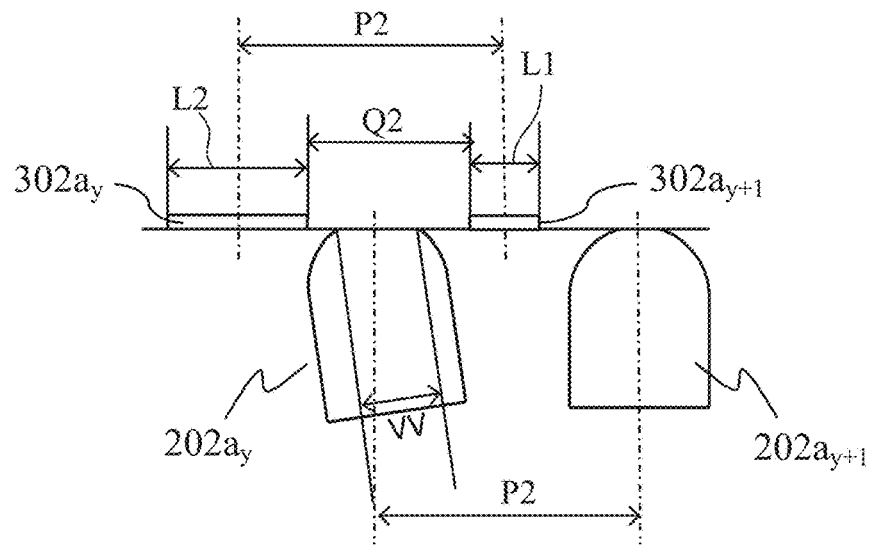

As a first condition, as shown in FIG. 9B, it is necessary that the first camera side contact pin $202a_y$ does not simultaneously make contact with the first and second lens side contact patterns $302a_y$ and $302a_{y+1}$ adjacent to each other during the rotation of the interchangeable lens for the lens attachment and detachment. That is, it is necessary to set the interval Q2 to be larger than a width VV of the possible pin contact area WW (Q2>VV). In addition, P2 is larger than VV (P2>VV).

Figure 9C:
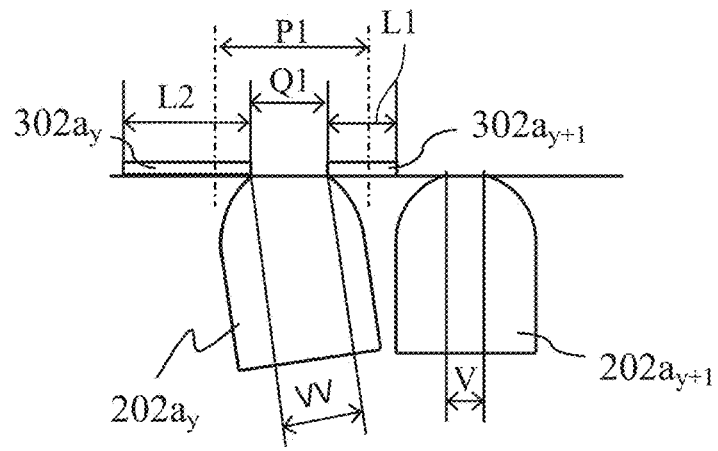

FIG. 9C shows a case where the pitch and interval of the first and second lens side contact patterns $302a_y$ and $302a_{y+1}$ adjacent to each other are set to P1 and Q1. In this case, the first camera side contact pin $202a_y$ simultaneously makes contact with the first and second lens side contact pattern $302a_y$ and $302a_{y+1}$.

As described above, the contact (hit) of the lens side contact base 302 to the camera side contact pin $202a_1$ is likely to cause the tilt or deformation of the camera side contact pin $202a_1$. If the camera side contact pin $202a_1$ simultaneously makes contact with the DTEF terminal pattern that is the first lens side contact pattern $302a_1$ and the DGND terminal pattern that is the second lens side contact pattern $302a_2$ adjacent thereto, the following failures are caused. As mentioned above, the camera microcomputer 20 determines that the type of the attached interchangeable lens 100 on the basis of the voltage value of the DTEF_IN terminal. If the camera side contact pin $202a_1$ simultaneously makes contact with the DTEF terminal pattern and the DGND terminal pattern, the DTEF terminal pattern and the DGND terminal pattern are conducted with each other, which is likely to cause the camera microcomputer 20 to make an erroneous determination of the type (lens type) of the attached interchangeable lens 100. Since the camera microcomputer 20 sets the communication voltage with the interchangeable lens 100 based on that determination result, the determination result indicating a different lens type from that of the actually attached interchangeable lens prevents setting of a proper communication voltage, which makes it impossible to perform good communication. Thus, this embodiment increases the interval between the first lens side contact pattern $302a_1$ and the second lens side pattern $302a_2$ adjacent thereto, in consideration of the tilt and deformation of the camera side contact pin $202a_1$.

As a second condition, it is necessary that one first lens side contact pattern $302a_{y+1}$ does not simultaneously make contact with the first and second camera side contact pins $202a_y$ and $202a_{y+1}$ adjacent to each other.

Furthermore, as a third condition, it is necessary to satisfy the above first and second conditions even if the distance between the first lens side contact patterns $302a_y$ is narrowed due to positional error thereof.

Satisfaction of the first to third conditions makes it possible to prevent failures, such as the power source short-circuiting, caused by simultaneous conduction of the mutually adjacent first and second lens side contact patterns $302a_y$ and $302a_{y+1}$ or the mutually adjacent first and second camera side contact pins $202a_y$ and $202a_{y+1}$.

FIGS. 3A and 3B show the pitches P1 and P2 as angle ranges $\theta_{P1}$ and $\theta_{P2}$ on the camera side and lens side contact bases 202 and 302 formed into a circular arc shape in the camera side and lens side mounts 201 and 301. Moreover, FIG. 3B shows the intervals Q1 and Q2 as angle ranges $\theta_{Q1}$ and $\theta_{Q2}$ on the circular arc-shaped lens side contact base 302 formed in the lens side mount 301.

When considering a rotation amount required for the bayonet coupling, in order to reduce the rotation amount, it is essentially desirable to reduce the pitch of the camera side contact pins as much as possible as long as the power source short-circuiting or the like can be prevented. However, it is necessary for the pitch of the first camera side contact pin $202a_1$ and the second camera side contact pin $202a_2$ adjacent thereto to consider, as mentioned above, the tilt and the deformation of the first camera side contact pin $202a_1$ due to the contact (hit) of the lens side contact base 302. Thus, this embodiment increases the pitch of the first camera side contact pin $202a_1$ and the second camera side contact pin $202a_2$ adjacent thereto as compared with that of the other second camera side contact pins $202a_2$ to $202a_9$.

Figure 10:
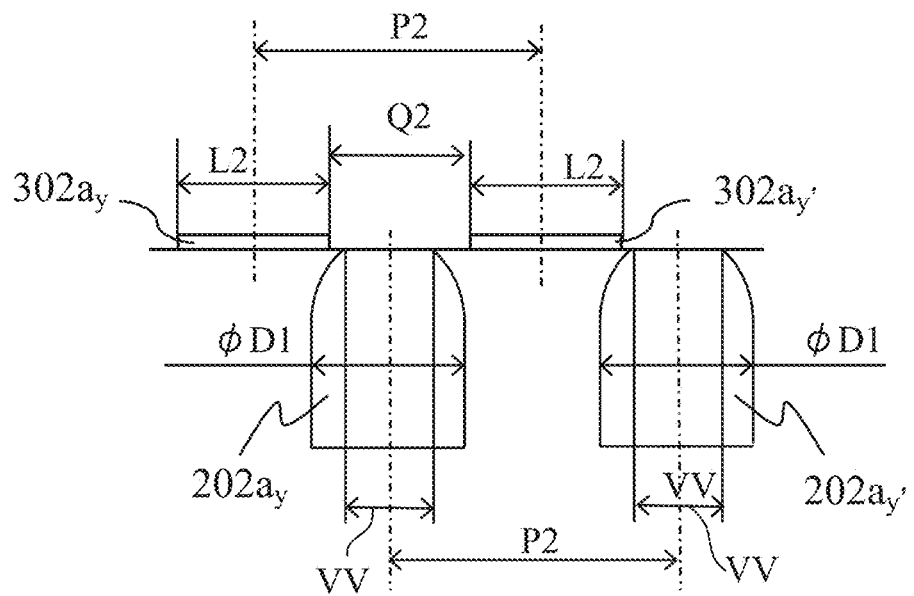
FIG. 10 shows camera side contact pins in a modified example of Embodiment 1.

Although this embodiment describes the case where one first lens side contact pattern and one camera side contact pin are provided, a plurality of the first lens side contact patterns may be provided together with a plurality of the first camera side contact pins. In this case, as shown in FIG. 10, it is desirable to respectively set the pitch and interval between the first lens side contact pattern $302a_y$ and the first lens side contact pattern $302a_y{'}$ adjacent thereto to P2 and Q2, and to set the pitch between the first camera side contact pin $202a_y$ and the first camera side contact pin $202a_y{'}$ adjacent thereto to P2. The pitch and the interval between the mutually adjacent first and second lens side contact patterns are set to P2 and Q2, and the pitch between the mutually adjacent first and second camera side contact pins is set to P2. However, it is not necessarily needed that the pitch and interval of the mutually adjacent first and second lens side contact patterns are same as those of the mutually adjacent first lens side contact patterns. In other words, when the former pitch and interval are represented by P2a and Q2a and the latter pitch and interval are represented by P2b and Q2b, they may have the following relationships:

$P2a \neq P2b$ (where $P1 < P2a$); and $Q2a \neq Q2b$ (where $Q1 < Q2a$).

In this case, the pitch between the mutually adjacent first lens side contact patterns and the pitch between the mutually adjacent first and second camera side contact pins are respectively set to P2a and P2b.

As described above, this embodiment uses the first and second lens side contact patterns and the first and second camera side contact pins which satisfy the following conditions (1) to (3). In the following conditions, as mentioned above, P2 includes P2a and P2b, and Q2 includes Q2a and Q2b.

$$L1 < L2 (\theta_{L1} < \theta_{L2}) \qquad (1)$$

$$P1 < P2 (\theta_{P1} < \theta_{P2}) \qquad (2)$$

$$Q1 < Q2 (\theta_{Q1} < \theta_{Q2}) \qquad (3)$$

The satisfaction of the conditions (1) to (3) enables securement of normal contact (electrical connection) of the first camera side contact pin and the first lens side contact pattern to make contact therewith even if the tilt or deformation is caused in the first camera side contact pin due to the hard contact (hit) of the lens side contact base to the first camera side contact pin. Consequently, the communication error between the camera 10 and the interchangeable lens 100 and the failure of the camera 10 or the interchangeable lens 100 due to the power source short-circuiting can be prevented.

In addition, as a condition for operation (or control) at the time of the attachment of the interchangeable lens to the camera, it is desirable to satisfy a fourth condition that the above-mentioned distance $L_A$ is shorter than or equal to the distance $L_B$. In other words, it is desirable that at least one of the width L2, the pitch P2 and the interval Q2 is set such that the connection of the DTEF terminal is established earlier than or simultaneously with that of the MIF terminal.

[The Diameter of the Camera Side Contact Pin]

Figure 12A:
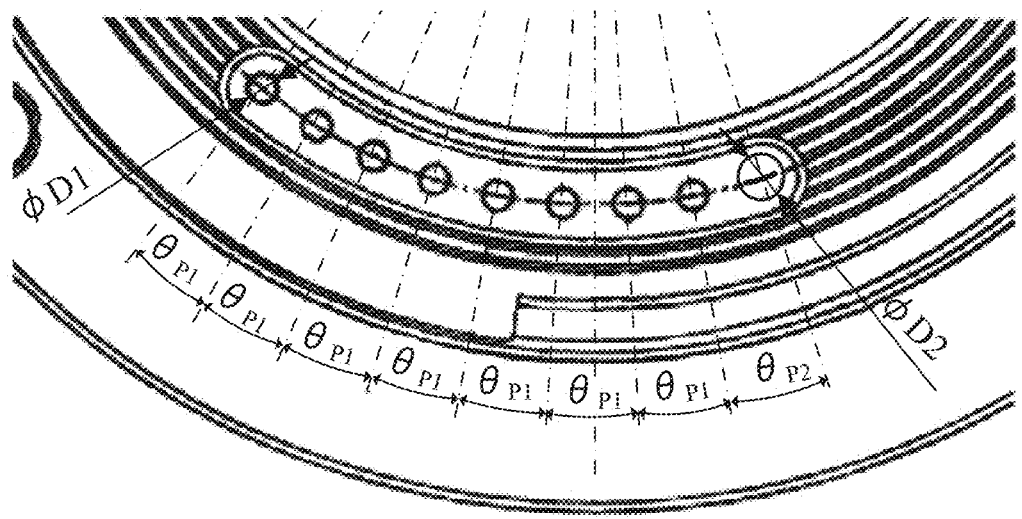
FIGS. 12A and 12B show camera side contact pins in another modified example of Embodiment 1.
Figure 12B:
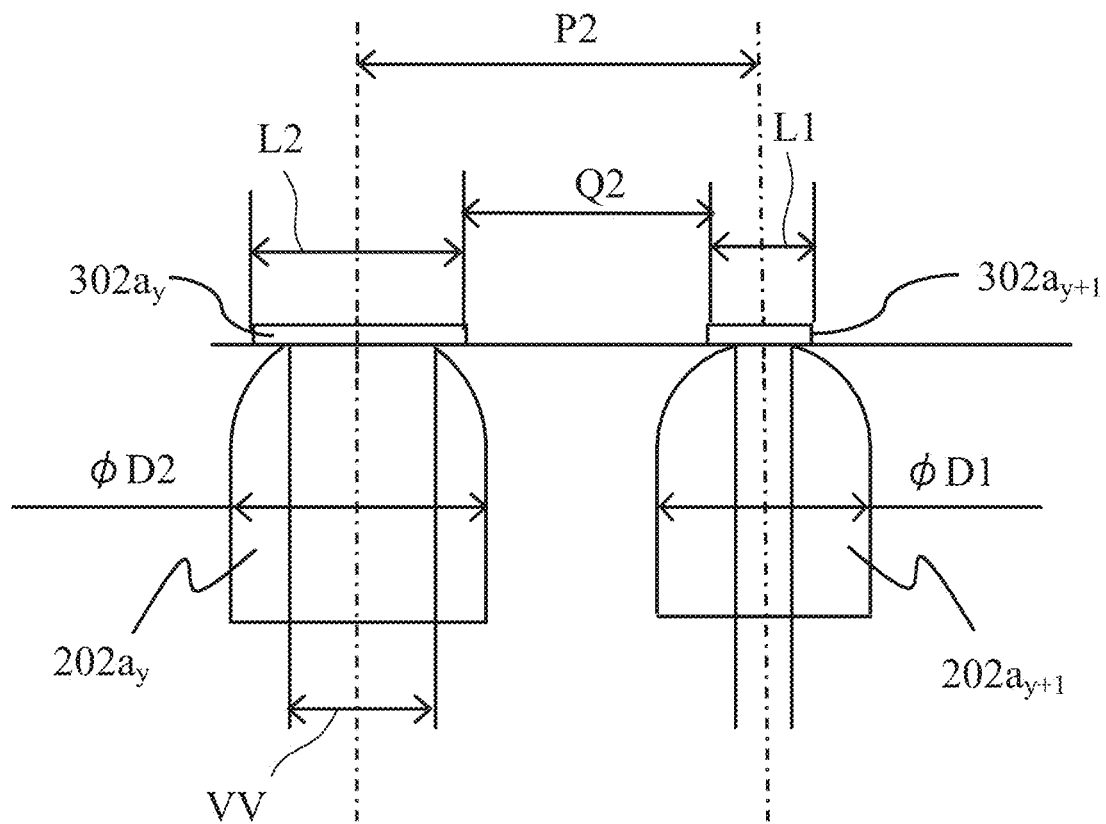

As described above, the first camera side contact pin $202a_y$ ($202a_1$) is likely to be deformed, such as being bent, by receiving the hard hit of the lens side contact base 302 in the mount in-contact state. Such deformation can be suppressed by setting a diameter φD2 of the first camera side contact pin $202a_y$($202a_1$) to be larger than a diameter φD1 of the second camera side contact pin $202a_{y+1}$ ($202a_2$ to $202a_9$) as shown in FIGS. 12A and 12B to increase rigidity of the first camera side contact pin $202a_y$ ($202a_1$).

In other words, the diameter φD2 of the first camera side contact pin $202a_y$ ($202a_1$) and the diameter φD1 of the second camera side camera side contact pin may be set so as to satisfy the following condition (4):

$$\varphi D1 < \varphi D2 \quad (4)$$

The satisfaction of the condition (4) can makes the communication error and the power source short-circuiting due to the deformation of the first camera side contact pin $202a_y$ more unlikely to be caused.

It is not necessarily needed to satisfy all the above-described conditions (1) to (4); it is only necessary to satisfy at least one of the conditions (1), (2) and (4). The satisfaction of at least one of the conditions (1), (2) and (4) enables securement of the normal contact of the first camera side contact pin tilted or deformed and the first lens side contact pattern. Moreover, the satisfaction of the condition (3) enables solution of the problem of the power supply short-circuiting described above.

Furthermore, the satisfaction of the above-mentioned condition that the distance $L_A$ is shorter than the distance $L_B$ (or the distance $L_B$ is longer than the distance $L_A$) or the distance $L_A$ is equal to the distance $L_B$ enables setting of the proper communication voltage for the type of the interchangeable lens attached to the camera before the communication between the camera and the interchangeable lens is started. Such preset of the proper communication voltage enables prevention of the communication error due to an improper communication voltage.

Figure 16:
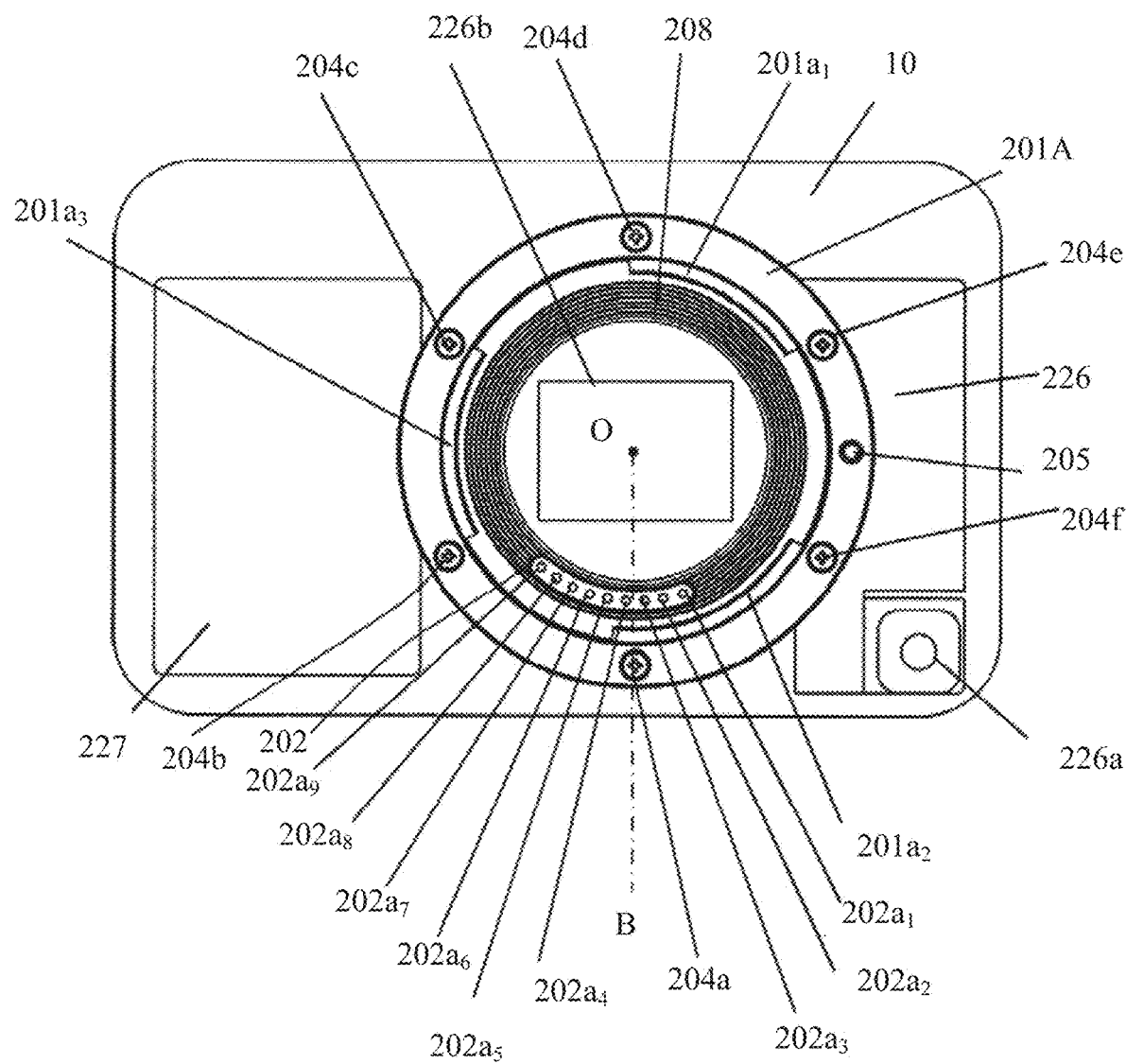
FIG. 16 is a front view of a configuration of a molded mount provided in the camera of Embodiment 1.
Figure 17:
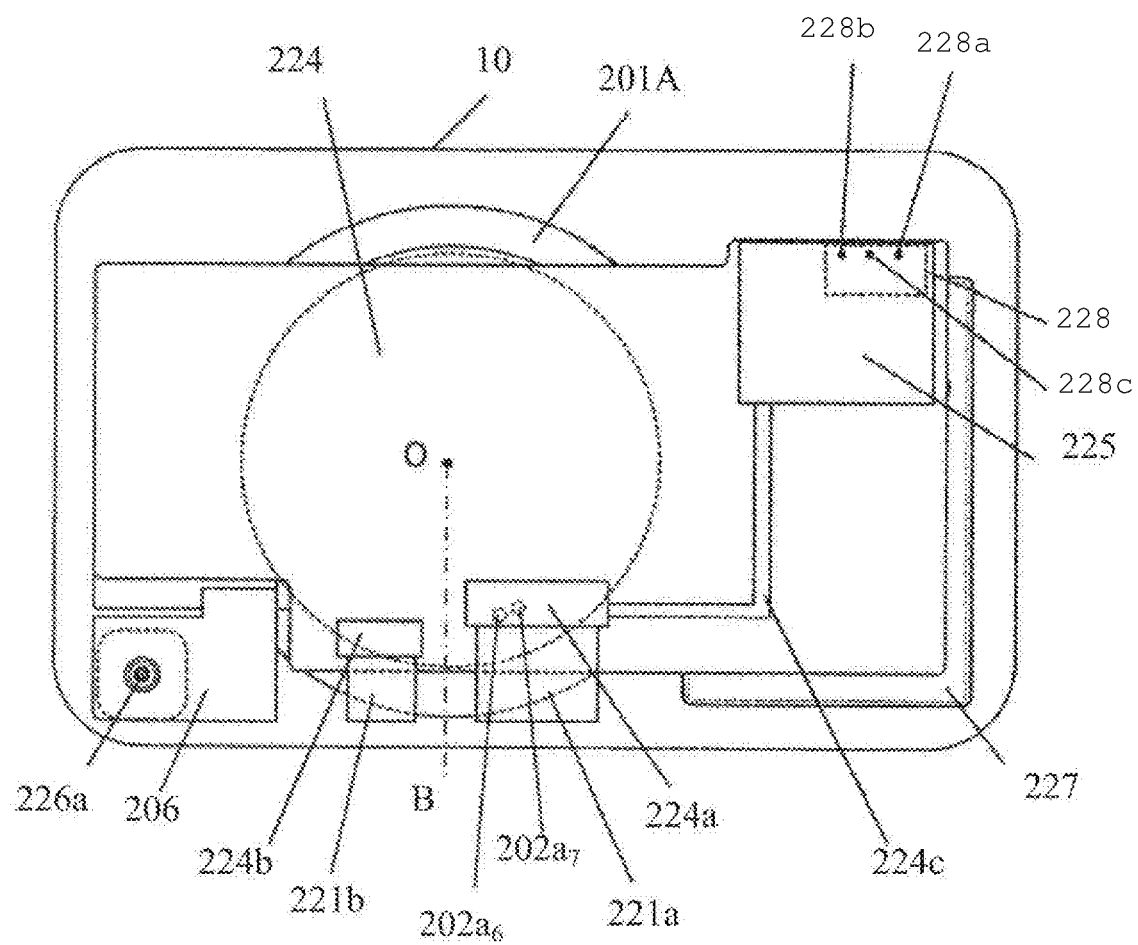
FIG. 17 is a rear view of the camera shown in FIG. 16.
Figure 18:
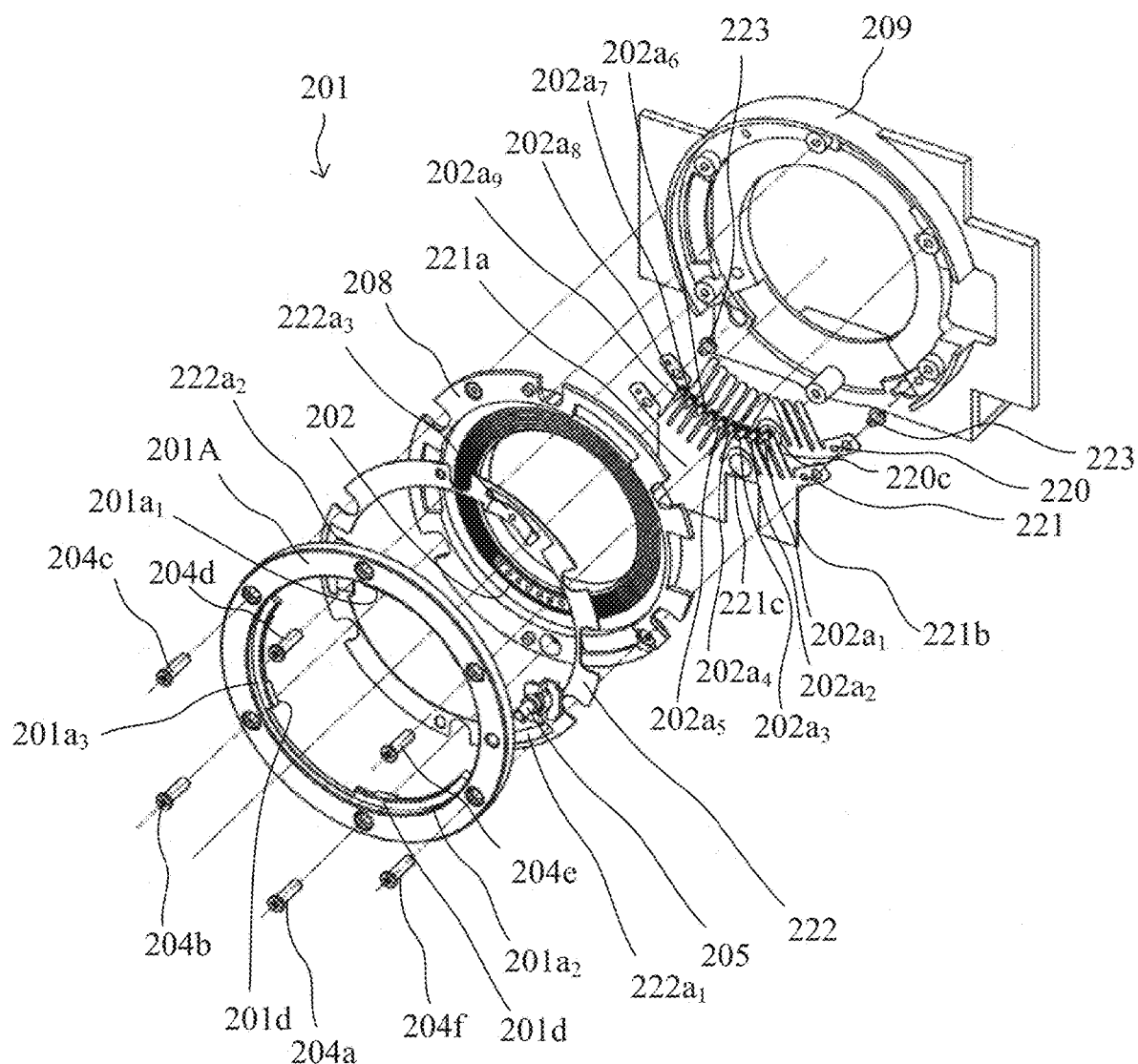
FIG. 18 is an exploded perspective view of the mount of the camera shown in FIG. 16.

FIGS. 16, 17 and 18 show the camera side mount 201 produced as a molded mount. FIG. 16 shows the camera side mount 201 and an internal configuration of the camera 10 which are viewed from front (direction facing the camera side mount 201). FIG. 17 shows an internal configuration of the camera 10 viewed from rear. FIG. 18 is an exploded perspective view of the camera side mount 201.

The configurations shown in FIGS. 16 to 18 are basically same as those shown in FIGS. 2A to 4; components common to those shown in FIGS. 2A to 4 are denoted by reference numerals identical to those in FIG. 2A to FIG. 4 and therefore description thereof is omitted. In the following description using FIGS. 16 to 18, of the camera side mount 201, a ring-shaped member having the mount reference surface 201b and the camera side bayonet claws $201a_1$ to $201a_3$ (shown by 201a in FIG. 2A) is referred to as "a molded mount 201A". The molded mount 201A is formed by resin molding using a resin such as glass fiber reinforced Polycarbonates.

FIGS. 16 to 18 show a case where the camera side mount 201 is constituted by the molded mount 201A, a mount base plate 208, a mount spring 222, the lock pin 205 and others.

Moreover, FIG. 18 shows a contact spring 220 formed using a leaf spring, which is used in place of the contact springs $202b_1$ to $202b_9$ formed using coil springs shown in FIG. 4. FIG. 18 shows that base ends of the camera side contact pins $202a_1$ to $202a_9$ are fixed and electrically connected to distal ends of nine wiring portions of a flexible printed wiring board 221 used in place of the flexible printed wiring board 206 shown in FIG. 4.

The flexible printed wiring board 221 and the contact spring 220 are fixed to a back face of the mount base plate 208 so as to overlap with each other in this order with two screws. The mount base plate 208 is provided with the above-described camera side contact base 202.

The flexible printed wiring board 221 is provided with a hole portion 221c through which a fastening screw 204a disposed at a lowest position (described later) penetrates. Moreover, the flexible printed wiring board 221 is provided with a first extension portion 221a and a second extension portion 221b on both side of the hole portion 221c in the mount circumferential direction. The first extension portion 221a is provided with six wiring patterns for the camera side contact pins $202a_4$ to $202a_9$. Moreover, the second extension portion 221b is provided with three wiring patterns for the camera side contact pins $202a_1$ to $202a_3$.

The contact spring 220 is disposed between the camera side mount 201 (mount base plate 208) and a camera body 209, and nine arm portions of the contact spring 220 respectively bias the camera side contact pin $202a_1$ to $202a_9$ in a direction of causing the camera side contact pins $202a_1$ to $202a_9$ to protrude from the camera side contact base 202. The contact spring 220 is also provided with a hole portion 220c through which the fastening screw 204a disposed at the lowest position penetrates. Of the nine arm portions of the contact spring 220, six spring arm portions for the camera side contact pins $202a_4$ to $202a_9$ and three spring arm portions for the camera side contact pins $202a_1$ to $202a_3$ are provided on both side of the hole portion 220c in the mount circumferential direction.

Figure 19:
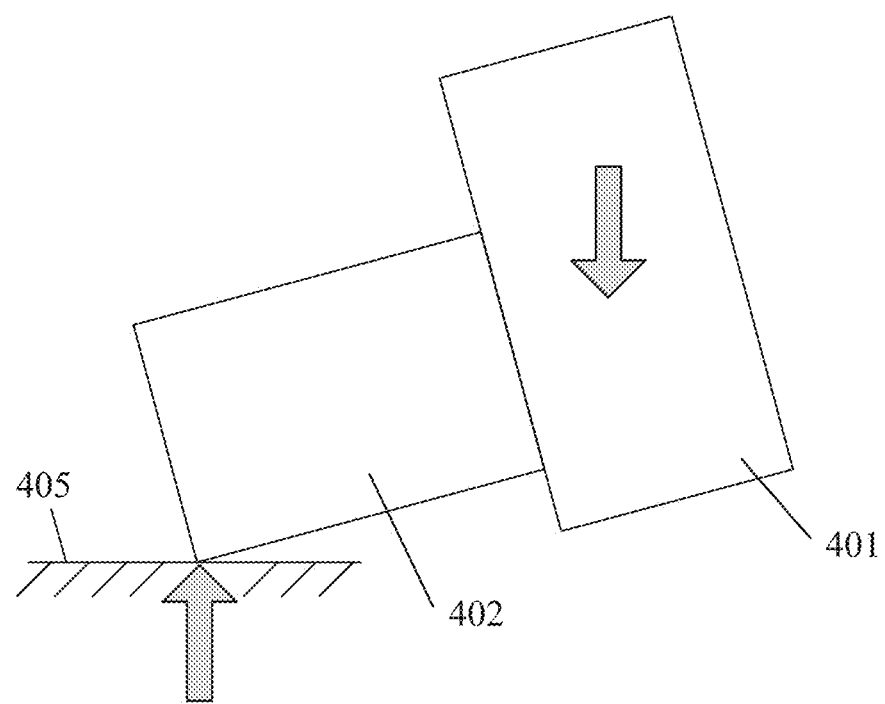
FIG. 19 shows falling of a camera to ground and an external force acting to mounts thereof.

Use of the molded mount 201A produced by the resin molding, as described above, as the camera side mount 201 might provide a lower strength as compared with a case of using a metal mount. The falling of the camera 10 to the ground, which was described in FIG. 19, causes a maximum external force to act to, among the three camera side bayonet claws $201a_1$ to $201a_3$ formed in the molded mount 201A, the camera side bayonet claw $201a_2$ formed within an angular range including the lowest position of the molded mount 201A.

In this description, a horizontally long position of the camera 10 shown in FIG. 16 is referred to as "a normal position (or a horizontal position or erected position)". The lowest position of the molded mount 201A (that is, of the camera side mount 201) is located on a camera side mount center line shown by a dashed dotted line B extending, in a state where the camera 10 is in the normal position, from a center O of the camera side mount 201 in a direction of gravity. In other words, of positions in the molded mount 201A in the mount circumferential direction, a position located lowest when the camera 10 is in the normal position corresponds to the lowest position of the molded mount. As well as the lowest position of the molded mount 201A, of positions in the camera side contact base 202 in the mount circumferential direction, a position located lowest (on the camera side mount center line B) when the camera 10 is in the normal position is a lowest position of the camera side contact base 202.

Reference numeral 204a to 204f denote fastening screws to fix the molded mount 201A to the camera body 209 shown in FIG. 18, which are arranged in the molded mount 201A at six places with equal intervals in the mount circumferential direction. Of these six fastening screws 204a to 204f, the fastening screw 204a is disposed such that its center is located at the lowest position of the molded mount 201A. Such arrangement of the camera side bayonet claw $201a_2$ and the fastening screw 204a at the lowest position to which the maximum external force acts when the camera 100 to which the interchangeable lens 100 is attached falls to the ground enables securement of a sufficient strength against impact due to the falling.

The molded mount 201A is provided with a hole portion allowing penetration of the above-mentioned lock pin 205 therethrough. The lock pin 205 protrudes and retracts through this hole portion with respect to the molded mount 201A.

Moreover, a shutter unit 226 is provided inside the camera 10. The shutter unit 226 includes shutter blades (not shown) that are charged to their closed state by a rotation operation of a shutter charging motor 226a as a camera side actuator. The shatter blades are moved, in response to release of the charge, in their opening direction with respect to a shutter aperture 226b, and then are moved in their closing direction again with being charged, which controls exposure amount of the image sensor 11 shown in FIG. 1A. The shutter charging motor 226a generates noise during its rotation operation to charge the shutter blades. The shutter charging motor 226a is disposed on a right side with respect to the camera side mount center line B when viewed from the front as shown in FIG. 16.

Moreover, a battery 227 is disposed on a left side with respect to the camera side mount center line B. When viewed from the front, as shown in FIG. 16, a left part of the molded mount 201A overlaps the battery 227. However, the two fastening screws 204b and 204c provided on the left part of the molded mount 201A are arranged at positions where interference of the fastening screws 204b and 304c with the battery 227 is avoided. This configuration makes it possible to bring the battery 227 close to the center O of the molded mount 201A (that is, of the camera side mount 201), which enables miniaturization of the camera 10.

The camera side contact base 202 is provided with the camera side contact pins $202a_1$ to $202a_9$ arranged in the mount circumferential direction, as shown also in FIGS. 2A and 3A.

A shown in FIG. 18, the mount spring 222 includes spring strip portions $222a_1$, $222a_2$ and $222a_3$ at three places in its circumferential direction (that is, in the mount circumferential direction). The spring strip portions $222a_1$, $222a_2$ and $222a_3$ pull the lens side bayonet claws 301a (shown in FIG. 2B) that engage with the camera side bayonet claws $201a_1$ to $201a_3$ toward the camera body 209.

The camera side bayonet claws $201a_1$ to $201a_3$ are provided with, at their back, static pressure receiving portions 201d. The static pressure receiving portions 201d have a function of making contact with the lens side bayonet claws 301a to hold the interchangeable lens without mediating of the mount spring 222 when a load equal to or greater than a predetermined value acts to the mount spring 222 (that is, on the spring strip portions $222a_1$ to $222a_3$) in a direction opposite to the camera body 209. The static pressure receiving portion 201d provided at the back of the camera side bayonet claw $201a_2$ formed within the angular range including the lowest position of the molded mount 201A is formed at the lowest position.

In the camera side mount 201 thus configured, as described above, the fastening screw 204a is disposed at the lowest position of the molded mount 201A. Therefore, the contact spring 220 is disposed so as to avoid interference with this fastening screw 204a between the camera side mount 201 (mount base plate 208) and the camera body 209. Specifically, the nine spring arms of the contact spring 220 are arranged so as to extend from both sides of the fastening screw 204a (that is, both sides of the camera side mount center line B) toward the camera side contact pins $202a_1$ to $202a_9$ to a side closer to the camera side mount center line B.

In this case, it is desirable to make biasing forces generated by the nine spring arms of the contact spring 220 sufficient to maintain the contact of the camera side contact pins $202a_1$ to $202a_9$ with the lens side contact patterns $302a_1$ to $302a_9$ and to make the biasing forces equal to one another. Moreover, it is necessary to configure a contact unit including the camera side contact pins $202a_1$ to $202a_9$ (flexible printed wiring board 221) and the contact spring 220 as small as possible. In order to achieve these requirements, it is necessary to make widths, lengths and elastic deformation amounts of the nine spring arms of the contact spring 220 respectively equal to one another.

If a camera side contact pin is provided at the lowest position that is just above the fastening screw 204a in the camera side contact base 202 and the widths and lengths of the nine spring arm portions of the contact spring 220 are respectively equal to one another, it is necessary to increase an inclination of each spring arm portion extending from a side of the fastening screw 204a to that camera side contact pin. As a result, it becomes necessary to increase not only a pitch of the nine spring arm portions of the contact spring 220, but also the pitch of the camera side contact pins $202a_1$ to $202a_9$ such that the pitch exceeds the above-described condition required for the pitch. Such increase of the pitch increases an angular range (hereinafter referred to as "an occupied angular range") occupied by the camera side contact pins $202a_1$ to $202a_9$ in the mount circumferential direction.

Moreover, if a camera side contact pin is disposed at the lowest position of the camera mount 201 (camera side contact base 202) where a maximum load (maximum external force) acts when the camera 10 falls to the ground, even though the molded mount 201A is tightly fixed by the fastening screw 204a, that camera side contact pin receives a maximum impact. In order to avoid defect such as bending or breaking of the camera side contact pin by such an impact, it is undesirable to provide the camera side contact pin at the lowest position of the camera side contact base 202.

Thus, in this embodiment, the camera side contact pins $202a_1$ to $202a_9$ are arranged, of positions in the camera side contact base 202 in the mount circumferential direction, at positions other than the lowest position when the camera 10 is in the normal position. Such arrangement enables sufficient and equal biasing of the camera side contact pins $202a_1$ to $202a_9$ in the protruding direction while making the occupied angular range of the camera side contact pins $202a_1$ to $202a_9$ small, and further enables improvement of impact resistance of the camera 100 falling to the ground.

In FIG. 17, reference numeral 224 denotes a circuit board, and 225 a power supply circuit block provided in the circuit board 224. Moreover, a broken line 226 in FIG. 17 shows a connector connected with terminals of the battery 227. The connector 226 is connected with the battery 227 through a positive terminal 226a, a negative terminal 226b and an information terminal 226c to supply source power to the power supply circuit block 225.

On the circuit board 224, reference numeral 224a denotes a first connector connected with the first extension portion 221a of the flexible printed wiring board 221, and 224b a second connector connected with the second extension portion 221b of the flexible printed wiring board 221. In the following description, in the camera side and lens side mounts 201 and 301, a side (one side) closer to the power supply circuit block 225 than the mount center line (camera side and lens [accessory] side mount center lines) extending from the center of the mount in the direction of gravity is simply referred to as "a power supply circuit side", and a side (another side) closer to the shutter charging motor 226a than the mount center line is referred to as "a motor side".

Of the camera side contact pins $202a_1$ to $202a_9$, a VBAT terminal pin $202a_7$ that is a power supplying contact pin is disposed on the power supply circuit side, together with a PGND terminal pin $202a_6$. That is, the VBAT terminal pin $202a_7$ through which a large current (power supplying current) passes is disposed closer to the power supply circuit block 225 as compared with a case where the VBAT terminal pin $202a_7$ is disposed on the motor side. This disposition reduces electrical loss due to wiring resistance of the circuit board 224 and flexible printed wiring board 221 when the power supplying current flows from the power supply circuit block 225 through the VBAT terminal pin $202a_7$.

Moreover, in the flexible printed wiring board 221, the first extension portion 221a connected with the six camera side contact pins $202a_4$ to $202a_9$ is disposed on the power supply circuit side. On the other hand, the second extension portion 221b connected with the three camera side contact pins $202a_1$ to $202a_3$ is disposed on the motor side. That is, number of the camera side contact pins $202a_4$ to $202a_9$ arranged on the power supply circuit side is greater than that of the camera side contact pins $202a_1$ to $202a_3$ arranged on the motor side. This arrangement achieves a configuration in which signal sending and receiving or the like between the camera 10 and the interchangeable lens 100 is hard to be influenced by the noise generated from the shutter charging motor 226a.

FIGS. 16 to 18 show the configuration of the camera 10, but do not show that of the interchangeable lens 100. However, arrangement of the lens side contact patterns $302a_1$ to $302a_3$ of the interchangeable lens 100 in the coupling completion state with respect to the camera 10 in the normal position corresponds to the arrangement of the camera side contact pins $202a_1$ to $202a_3$ of the camera 10 in the normal position, which was described in FIGS. 16 to 18.

In other words, the lens side contact patterns $302a_1$ to $302a_9$ are arranged, of positions in the lens side contact base 302 in the mount circumferential direction, at positions other than a lowest position (on the lens side mount center line) that becomes lowest in the coupling completion state when the camera 10 is in the normal position.

When the interchangeable lens 100 in the coupling completion state with respect to the camera in the normal position is viewed from a direction facing the lens side mount, of the lens side contact patterns $302a_1$ to $302a_9$, a VBAT terminal pattern $302a_7$ is disposed on a power supply circuit side corresponding to the power supply circuit side of the camera 10, together with a PGND terminal pattern $302a_6$. Furthermore, number of the lens side contact patterns $302a_4$ to $302a_9$ arranged on the power supply circuit side is greater than that of the lens side contact patterns $302a_1$ to $302a_3$ arranged on a motor side corresponding to the motor side of the camera 10.

As described above, this embodiment arranges the camera side contact pins $202a_1$ to $202a_9$ and the lens side contact patterns $302a_1$ to $302a_9$ at the positions, in the camera side and lens side contact bases 202 and 302, other than the position on the mount center line when the camera 10 is in the normal state (and in the coupling completion state). This arrangement can make the occupied angular range of the camera side contact pins $202a_1$ to $202a_9$ and that of the lens side contact patterns $302a_1$ to $302a_9$ in the camera side and lens side mounts 201 and 301, which enables miniaturization of the camera 10 and the interchangeable lens 100. Moreover, this embodiment arranges the camera side power supplying contact pin $202a_7$ and the lens side power supplying contact pattern $302a_7$ on the power supply circuit side, and makes the number of the contacts (pins and patterns) arranged on the power supply circuit side greater than that of the contacts arranged on the motor side. This arrangement achieves a configuration enabling reduction of the electrical loss due to the wiring resistance and also having noise tolerance.

The above embodiment described the case of providing the fastening screw 204a at the lowest position of the molded mount 201A. However, even in a case of providing a boss or the like to position the molded mount 201A in the mount circumferential direction in place of the fastening screw 204a, the arrangement of the contact pins and patterns described above can provide the above-described effects. Furthermore, the configuration shown in FIGS. 16 to 18 can be applied to a case of using a metal mount in place of the molded mount 201A.

Embodiment 2

Figure 11A:
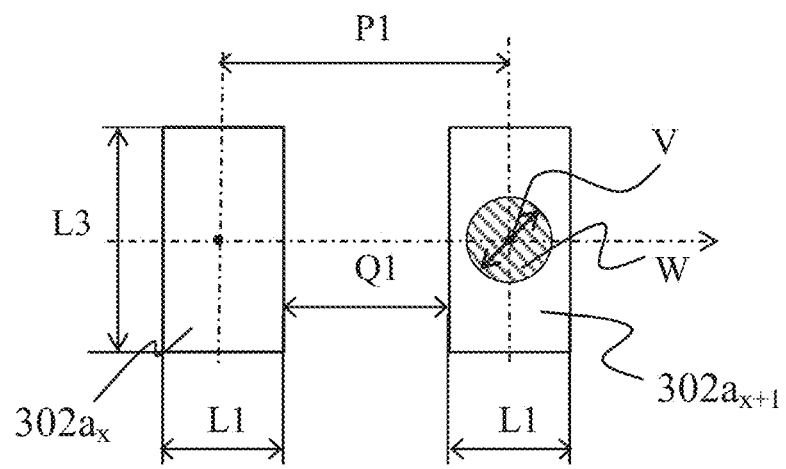
FIGS. 11A to 11C show lens side contact patterns and camera side contact pins in Embodiment 2 of the present invention.
Figure 11B:
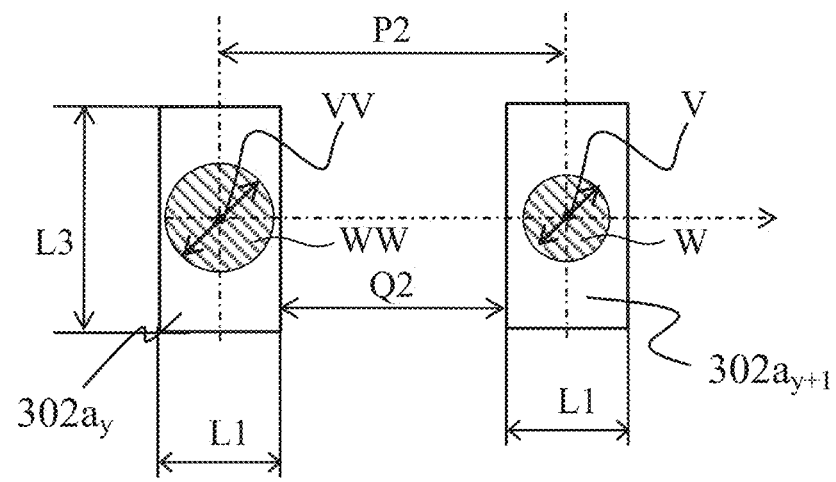
Figure 11C:
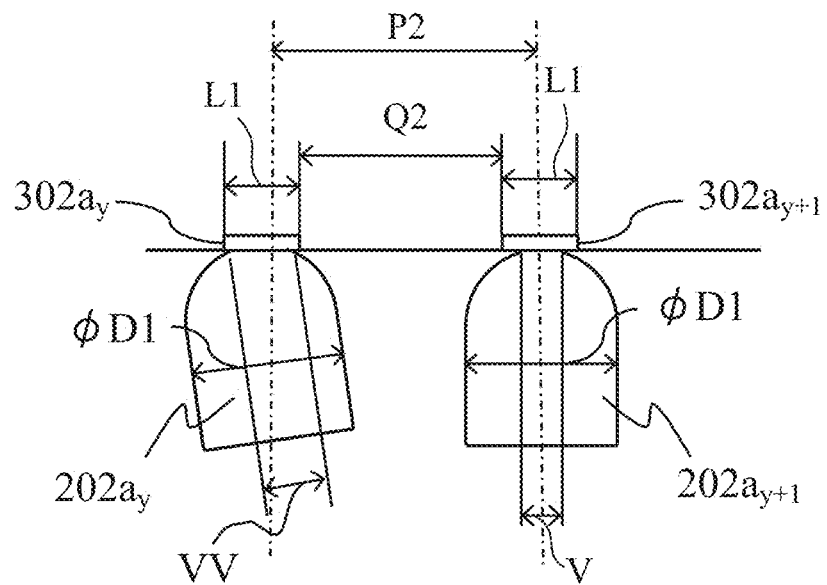

FIGS. 11A to 11C show, as a second embodiment of the present invention, a case of satisfying the above-described conditions (2) and (3), but not satisfying the conditions (1) and (4). In this embodiment, the pitch P2 and the interval Q2 between the mutually adjacent first and second lens side contact patterns $302a_y$ and $302a_{y+1}$ are larger than the pitch P1 and the interval Q1 between the mutually adjacent second lens side contact patterns $302a_x$ and $302a_{x+1}$. Moreover, the pitch P2 between the mutually adjacent first and second camera side contact pins $202a_y$ and $202a_{y+1}$ is also larger than the pitch P1 between the mutually adjacent second camera side contact pins $202a_x$ and $202a_{x+1}$.

However, the width of the first lens side contact pattern $302a_y$ is equal to L1 that is the width of the second lens side contact pattern $302a_x$ ($302a_{y+1}$). However, L1 in this embodiment is set to be larger than L1 shown in Embodiment 1, and is set to be larger than the possible pin contact area WW, of the first lens side contact pattern $302a_y$, where the first camera side contact pin $202a_y$ may make contact.

In addition, the diameters of the first and second camera side contact pins $202a_y$ and $202a_{y+1}$ ($202a_x$ and $202a_{x+1}$) are all equal to φD1.

Also in this case, normal contact of the tilted or deformed first camera side contact pin and the first lens side contact pattern can be secured, which can prevent the communication error between the camera and the interchangeable lens and the power source short-circuiting.

Moreover, as a further another embodiment, in a case of satisfying the condition (2), but not satisfying the conditions (1), (3) and (4), normal contact of the tilted or deformed first camera side contact pin and the first lens side contact pattern can be secured, which can prevent the communication error between the camera and the interchangeable lens.

Although each of the above embodiments described the case of setting the heights of the first and second lens side contact patterns to L3, the heights thereof may be different from each other.

Each of the above-described embodiments enables, since the multiple camera side contact pins are arranged at the positions in the camera side contact holding portion (camera side contact base) other than the position on the mount center line B, decrease of the pitch of the portions (spring arm portions) of the leaf spring (contact spring) each biasing each camera side contact pin, which enables decrease of the occupied angular range of the multiple camera side contact pins and thereby enables miniaturization of the camera. Moreover, the arrangement of the multiple accessory side contact surfaces (lens side contact patterns) according to that of the camera side contact pins also enables miniaturization of the camera accessory.

Furthermore, each of the above-described embodiments arranges the camera side and accessory side power supplying contacts (contact pins and patterns) on the power supply circuit side, and makes the number of the contacts arranged on the power supply circuit side greater than that of the contacts arranged on the motor side. This arrangement achieves a configuration enabling reduction of electrical loss due to wiring resistance and also having noise tolerance.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application Nos. 2012-161142, filed on Jul. 20, 2012, 2012-150961, filed on Jul. 5, 2012 and 2012-085426, 2012-085223 and 2012-085190 filed on Apr. 4, 2012, which are hereby incorporated by reference herein in their entirety.

What is claimed is:

1. A camera on which a camera accessory is detachable and attachable, comprising:
    a mount portion including a circular portion;
    a power supply circuit;
    an actuator; and
    a plurality of contact pins arranged along a circumferential direction of the mount portion and configured to be used in electrical connection with the camera accessory,
    wherein the plurality of contact pins include:
        first and second contact pins to be used for sending a power supply to the camera accessory; and
        a third contact pin to be used for detection of type of the camera accessory;
    wherein a voltage of the third contact pin differs depending on the type of the camera accessory so as to set a communication voltage with the camera accessory, and
    wherein, when viewing the mount portion from a center-axis direction of the mount portion which is orthogonal to the circumferential direction, the first and second contact pins are located closer to the power supply circuit than the third contact pin, and the third contact pin is located closer to the actuator than the first contact pin and the second contact pin.

2. The camera according to claim 1,
    wherein the plurality of contact pins include a fourth contact pin to be used for detecting that the camera accessory is coupled to the camera,
    wherein the third contact pin is located on one end of an arrangement of the plurality of contact pins, and
    wherein the fourth contact pin is located on the other end of the arrangement of the plurality of contact pins.

3. The camera according to claim 2,
    wherein the fourth contact pin and the first contact pin are disposed adjacent to each other, and the first contact pin and the second contact pin are disposed adjacent to each other, and
    wherein the plurality of contact pins include at least one contact pin which is located between the second contact pin and the third contact pin.

4. The camera according to claim 3,
    wherein a total number of the plurality of contact pins is an odd number.

5. The camera according to claim 1, further comprising;
    a shutter, and
    wherein the actuator is a motor which drives the shutter.

6. The camera according to claim 5,
    wherein the first contact pin is used for a power supply to the camera accessory for communication, and
    wherein the second contact pin is used for a power supply to the camera accessory for driving a second actuator.

7. A camera accessory configured to be attachable on and detachable from a camera, comprising:
    a mount portion including a circular portion; and
    a plurality of contact surfaces arranged along a circumferential direction of the mount portion and configured to be used in electrical connection with the camera,
    wherein the plurality of contact surfaces include:
        first and second contact surfaces to be used for receiving a power supply from the camera; and
        a third contact surface to be used for detection of type of the camera accessory;
    wherein, when viewing the mount portion from a center-axis direction of the mount portion which is orthogonal to the circumferential direction, the third contact surface is located on one end of an arrangement of the plurality of contact surfaces,
    wherein the third contact surface indicates a predetermined voltage in relation to the type of the camera accessory,
    wherein the first contact surface and the second contact surface are adjacent to each other,
    wherein the plurality of contact surfaces include at least one fourth contact surface different from the first contact surface, the second contact surface and the third contact surface, and wherein the at least one fourth contact surface is located between the second contact surface and the third contact surface.

8. The camera accessory according to claim 7,
    wherein the plurality of contact surfaces include a fifth contact surface to be used for detecting that the camera accessory is coupled to the camera, and
    wherein the fifth contact surface is located on the other end of the arrangement of the plurality of contact surfaces.

9. The camera accessory according to claim 8, wherein the fifth contact surface and the first contact surface are disposed adjacent to each other, and the first contact surface and the second contact surface are disposed adjacent to each other.

10. The camera accessory according to claim 9,
    wherein a total number of the plurality of contact surfaces is an odd number.

11. The camera accessory according to claim 7,
    wherein the first contact surface is used for a power supply from the camera for communication, and
    wherein the second contact surface is used for a power supply from the camera for driving an actuator.

12. The camera accessory according to claim 7,
    wherein the at least one fourth contact surface is used for outputting communication data to the camera connected to the camera accessory.

13. The camera accessory according to claim 7,
    wherein the at least one fourth contact surface is used for a communication clock signal.

14. The camera accessory according to claim 7,
wherein the at least one fourth contact surface is used for indicating a reference potential corresponding to the first contact surface.

15. The camera accessory according to claim 7,
wherein the at least one fourth contact surface is used for indicating a reference potential corresponding to the second contact surface.

* * * * *